US012759917B2

(12) United States Patent
Kang et al.

(10) Patent No.: US 12,759,917 B2
(45) Date of Patent: Oct. 13, 2026

(54) WATER PURIFIER

(71) Applicant: SAMSUNG ELECTRONICS CO., LTD., Suwon-si (KR)

(72) Inventors: Wanku Kang, Suwon-si (KR); Junggeun Lee, Suwon-si (KR); Jongho Lee, Suwon-si (KR); Yeonwoo Cho, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 448 days.

(21) Appl. No.: 17/853,272

(22) Filed: Jun. 29, 2022

(65) Prior Publication Data

US 2022/0324738 A1 Oct. 13, 2022

Related U.S. Application Data

(63) Continuation of application No. PCT/KR2021/000498, filed on Jan. 13, 2021.

(30) Foreign Application Priority Data

Feb. 4, 2020 (KR) ........................ 10-2020-0013323
Mar. 25, 2020 (KR) ........................ 10-2020-0036504
Dec. 24, 2020 (KR) ........................ 10-2020-0182712

(51) Int. Cl.
*C02F 9/20* (2023.01)

(52) U.S. Cl.
CPC .......... *C02F 9/20* (2023.01); *C02F 2201/007* (2013.01); *C02F 2209/02* (2013.01)

(58) Field of Classification Search
None
See application file for complete search history.

(56) References Cited

U.S. PATENT DOCUMENTS

| | | | | |
|---|---|---|---|---|
| 4,683,054 | A | 7/1987 | Turnbull | |
| 5,669,221 | A * | 9/1997 | LeBleu | E03B 3/28 62/150 |
| 10,167,208 | B2 | 1/2019 | Lee et al. | |
| 10,864,468 | B2 | 12/2020 | Jeon et al. | |
| 2011/0284436 | A1* | 11/2011 | Shin | C02F 9/20 210/143 |
| 2016/0101225 | A1* | 4/2016 | Smith | A61M 1/166 210/660 |
| 2016/0214041 | A1 | 7/2016 | Miller et al. | |
| 2017/0319990 | A1 | 11/2017 | Jeon et al. | |
| 2018/0186655 | A1* | 7/2018 | Cobb | E03C 1/044 |

FOREIGN PATENT DOCUMENTS

| | | | |
|---|---|---|---|
| CN | 104556511 | B | 8/2016 |
| CN | 107445217 | | 12/2017 |
| DE | 20 2014 102 169 | U1 | 9/2015 |
| JP | 2006-101962 | A | 4/2006 |
| JP | 2015-30509 | A | 2/2015 |
| KR | 10-0197301 | B1 | 6/1999 |
| KR | 20-0289048 | Y | 9/2002 |
| KR | 20-0369056 | Y | 12/2004 |
| KR | 20-0460254 | Y | 5/2012 |
| KR | 10-2013-0047390 | | 5/2013 |
| KR | 10-1272195 | B1 | 6/2013 |
| KR | 10-2013-0112279 | | 10/2013 |
| KR | 10-1374778 | B1 | 3/2014 |
| KR | 10-2014-0073970 | | 6/2014 |
| KR | 10-1435107 | B1 | 8/2014 |
| KR | 10-2015-0068169 | | 6/2015 |
| KR | 10-1627615 | B1 | 6/2016 |
| KR | 10-1643872 | B1 | 7/2016 |
| KR | 10-1901960 | | 9/2018 |
| KR | 10-2019-0108381 | | 9/2019 |
| KR | 10-2063223 | B1 | 1/2020 |
| KR | 10-2071130 | B1 | 1/2020 |
| WO | WO 2013/141438 | A1 | 9/2013 |
| WO | WO 2019/147023 | A1 | 8/2019 |

OTHER PUBLICATIONS

Extended European Search Report dated Dec. 15, 2022 in European Patent Application No. 21750075.0 (8 pages).
Office Action issued by the European Patent Office on Sep. 4, 2024 for European Patent Application No. 21 750 075.0.
Office Action issued by the Chinese Patent Office on Aug. 1, 2024 for Chinese Patent Application No. 202180012572.X.
International Search Report dated Apr. 28, 2021 from International Application No. PCT/KR2021/000498.
European Office Action dated Aug. 20, 2025 for European Application No. 21750075.0.
Chinese Office Action dated May 27, 2025 for Chinese Application No. 202180012572.X.
Chinese Office Action issued in counterpart Chinese Application No. 202180012572.X dated Jan. 27, 2025.
Korean Office Action dated Oct. 14, 2025 for Korean Application No. 10-2020-0182712.
Indian Office Action dated Aug. 25, 2026 for Indian Application No. 202217039291.

* cited by examiner

*Primary Examiner* — Ryan B Huang
(74) *Attorney, Agent, or Firm* — STAAS & HALSEY LLP

(57) ABSTRACT

A water purifier is disclosed. The water purifier according to a concept of the disclosure includes: a first module including a filter unit including a plurality of filters; a second module including a controller configured to control the first module, the second module coupled with the first module; and a water supply module including a display connected to the second module and displaying operation information of the water purifier, and a water supply nozzle receiving purified water from the first module and discharging the purified water to outside, wherein the controller is configured to control the display to display a purified water supply mode corresponding to the first module coupled with the second module.

18 Claims, 18 Drawing Sheets

(300: 310, 320, 330, 340, 340, 350, 360)

(300: 310, 320, 330, 340, 340, 350, 360)

( a )

( b )

( c )

WATER PURIFIER

CROSS-REFERENCE TO RELATED APPLICATION(S)

This application is a continuation application, under 35 U.S.C. § 111(a), of International Application No. PCT/KR2021/000498, filed on Jan. 13, 2021, which is based on and claims priority under 35 U.S.C. § 119 to Korean Patent Application No. 10-2020-0013323, filed on Feb. 4, 2020, Korean Patent Application No. 10-2020-0036504, filed on Mar. 25, 2020; and Korean Patent Application No. 10-2020-0182712, filed on Dec. 24, 2020, in the Korean Intellectual Property Office, the disclosures of which are incorporated by reference herein in their entirety.

BACKGROUND

1. Field

The present disclosure relates to a water purifier, and more particularly, to a modularized water purifier.

2. Description of Related Art

A water purifier is an apparatus for supplying clean water to users by filtering received water through one or more water purifying filters. A cold and hot water purifier includes a configuration for adding functions of a water cooler and a water heater to a general water purifier having only a water purifying function in one space. That is, a filter, a heater as a general configuration of a water heater, and a cooling system using a refrigerant as a general configuration of a water cooler are included in one space.

A user who uses a typical water purifier having only a water purifying function had to have bought, when additionally needing cold water and hot water, a water purifier having a cold and hot water purifying function.

SUMMARY

The disclosure provides a water purifier modularized to meet a user's requirement.

Another aspect of the disclosure provides a water purifier capable of additionally providing a cold water function and a cold and hot water function by adding modules.

Still another aspect of the disclosure provides a water purifier in which modules are easily coupled with and separated from each other.

A water purifier according to a concept of the disclosure includes: a first module including a filter unit including a plurality of filters; a second module couplable with the first module, the second module including a controller configured to control the first module, while the second module is coupled with the first module; and a water supply module including a display connectable to the second module and to display operation information of the water purifier, and a water supply nozzle to receive the purified water from the first module and discharge the purified water to outside, wherein the controller is configured to control the display to display a purified water supply mode corresponding to the first module coupled with the second module.

The first module may include a filter case forming an outer appearance of the filter unit and accommodating the plurality of filters, and the second module may include a control case forming an outer appearance of the second module and accommodating the controller, the control case being couplable to and decouplable from the filter case.

The first module may include a first input and output port formed at one side of the filter case, the second module may include a second input and output port formed at one side of the control case which is electrically connectable to the first input and output port, and while the first input and output port is connected to the second input and output port, the water purifier may display the purified water supply mode corresponding to the first module on the display.

The first module may include an evaporator configured to cool the purified water, and further include a cold water unit couplable to and decouplable from the filter unit, and the controller may be configured to recognize, while the second module is electrically connected to the cold water unit, the cold water unit, change the purified water supply mode to a cold water supply mode, and control the display to display the cold water supply mode.

The first module may include an evaporator configured to cool the purified water and a heater configured to heat the purified water, and further includes a cold and hot water unit detachably coupled with the filter unit, and the controller may be configured to recognize, while the second module is electrically connected to the cold and hot water unit, the cold and hot water unit, change the purified water supply mode to a cold and hot water supply mode, and control the display to display the cold and hot water supply mode.

The second module may include: an internal pipe along which the purified water moves inside the control case, and an inlet and output portion formed in an outer surface of the control case, wherein the purified water enters or exits the inlet and outlet portion.

The first module may include a cold water case forming an outer appearance of the cold water unit and accommodating the evaporator, and a filter case forming an outer appearance of the filter unit and accommodating the plurality of filters, and the cold water case slidingly couplable with the filter case.

The first module may include a cold and hot water case forming an outer appearance of the cold and hot water unit and accommodating the evaporator and the heater, and a filter case forming an outer appearance of the filter unit and accommodating the plurality of filters, and the cold and hot water unit may be slidingly couplable with the filter case.

The water purifier may further include at least one connecting hose provided between the first module and the second module to connect the first module to the second module, wherein the at least one connecting hose may include: a raw water connecting hose along which raw water moves; a purified water connecting hose along which the purified water moves; and a drainage water connecting hose through which drainage water is discharged to outside.

The first module may include: the filter case forming an outer appearance of the filter unit and to accommodate the plurality of filters, and a cold water case couplable to and decouplable from at least one of the filter case or the control case and accommodating the evaporator to cool the purified water, the second module may include: the control case accommodating the controller and couplable to and decouplable from the filter case; and a first connecting portion depressed from a coupling surface of the control case with respect to the cold water case, and the cold water unit may include a second connecting portion protruding from a coupling surface of the cold water case with respect to the control case to correspond to the first connecting portion.

The first module may include: a filter case to form an outer appearance of the filter and to accommodate the plurality of filters; and a cold and hot water case couplable to and decouplable from at least one of the filter case or the control case, and accommodating the evaporator configured to cool the purified water and the heater configured to heat the purified water, and the second module may include: the control case accommodating the controller and couplable to and decouple from the filter case; and a first connecting portion depressed from a coupling surface of the control case with respect to the cold and hot water case, and the cold and hot water unit may include a second connecting portion protruding from a coupling surface of the cold and hot water case with respect to the control case to correspond to the first connecting portion.

The second module may include a control unit including the controller and the control case, the first connecting portion may include: a purified water outlet to discharge the purified water from the control unit to the cold water unit; a cold water inlet through which purified water cooled by the evaporator flows from the cold water unit to the control unit; and a first connector electrically connecting the cold water unit to the control unit, and the second connecting portion may include: a purified water inlet connectable to the purified water outlet; a cold water outlet connectable to the cold water inlet; and a second connector electrically connectable to the first connector.

The second module may include a control unit including the controller and the control case, the first connecting portion may include: a purified water outlet through which the purified water is discharged from the control unit to the cold and hot water unit; a cold water inlet through which purified water cooled by the evaporator flows from the cold and hot water unit to the control unit; a hot water inlet through which purified water heated by the heater flows from the cold and hot water unit to the control unit; and a first connector electrically connecting the cold water unit to the control unit, and the second connecting portion may include: a purified inlet connectable to the purified water outlet; a cold water outlet connectable to the cold water inlet; a hot water outlet connectable to the hot water inlet; and a second connector electrically connected to the first connector.

A water purifier according to a concept of the disclosure includes: a filter unit including a filter and a filter case accommodating the filter; and a cold and hot water unit including an evaporator configured to cool purified water, a heater configured to heat the purified water, and a cold and hot water case accommodating the evaporator and the heater, wherein the filter case is slidingly coupled with the cold and hot water case.

The water purifier may further include a first module including the filter unit and the cold and hot water unit, and a second module including a controller configured to control the filter unit, and a control case forming an outer appearance, accommodating the controller, and coupled with the filter case, wherein the control case is detachably coupled with the filter case.

The filter case may include a first surface in which an input and output port is formed to be electrically connected to the control case, and a second surface in which a module coupling groove is formed to be coupled with the control case.

The control case may further include a first coupling area coupled with the filter case, and a second coupling area coupled with the cold and hot water case, the cold and hot water case may be detachably coupled with at least one of the filter case or the control case, at least one of the filter case or the control case may include a first connecting portion depressed from a coupling surface of the cold and hot water case, and the cold and hot water case may include a second connecting portion protruding from a coupling surface of at least one of the filter case or the control case to correspond to the first connecting portion.

The filter case may be detachably coupled with the cold and hot water case, at least one surface of the filter case and the cold and hot water case may further include a guide protrusion protruding toward outside, and the other surface may include a guide groove accommodating the guide protrusion.

A water purifier according to a concept of the disclosure includes: a main module including a first module including a plurality of filters, and a second module including a controller configured to control the first module; and a water supply module including a display connected to the second module and displaying operation information of the water purifier, and a water supply nozzle receiving purified water from the first module and discharging the purified water to outside, wherein the controller is configured to control the display to display a purified water supply mode corresponding to the first module coupled with the second module.

The main module may include a main case forming an outer appearance of the main module, and the water purifier may include a cold and hot water unit including an evaporator configured to cool purified water, and a cold and hot water case accommodating the evaporator, wherein the main case is detachably coupled with the cold and hot water case.

Advantageous Effects

According to a concept of the disclosure, there is provided a water purifier capable of coupling and using modules according to a user's need due to modularized configurations.

According to a concept of the disclosure, there is provided a water purifier capable of additionally providing a cold water function and a cold and hot water function by adding modules.

According to a concept of the disclosure, there is provided a water purifier capable of easily coupling/separating modules with/from each other through a guide protrusion and a guide groove.

According to a concept of the disclosure, there is provided a water purifier capable of easily coupling/separating modules with/from each other through a button and a button groove.

BRIEF DESCRIPTION OF THE DRAWINGS

The above and other aspects features and advantages of certain embodiments of the present disclosure will be more apparent from the following description taken in conjunction with the accompanying drawings, in which.

DETAILED DESCRIPTION

Figure 1:
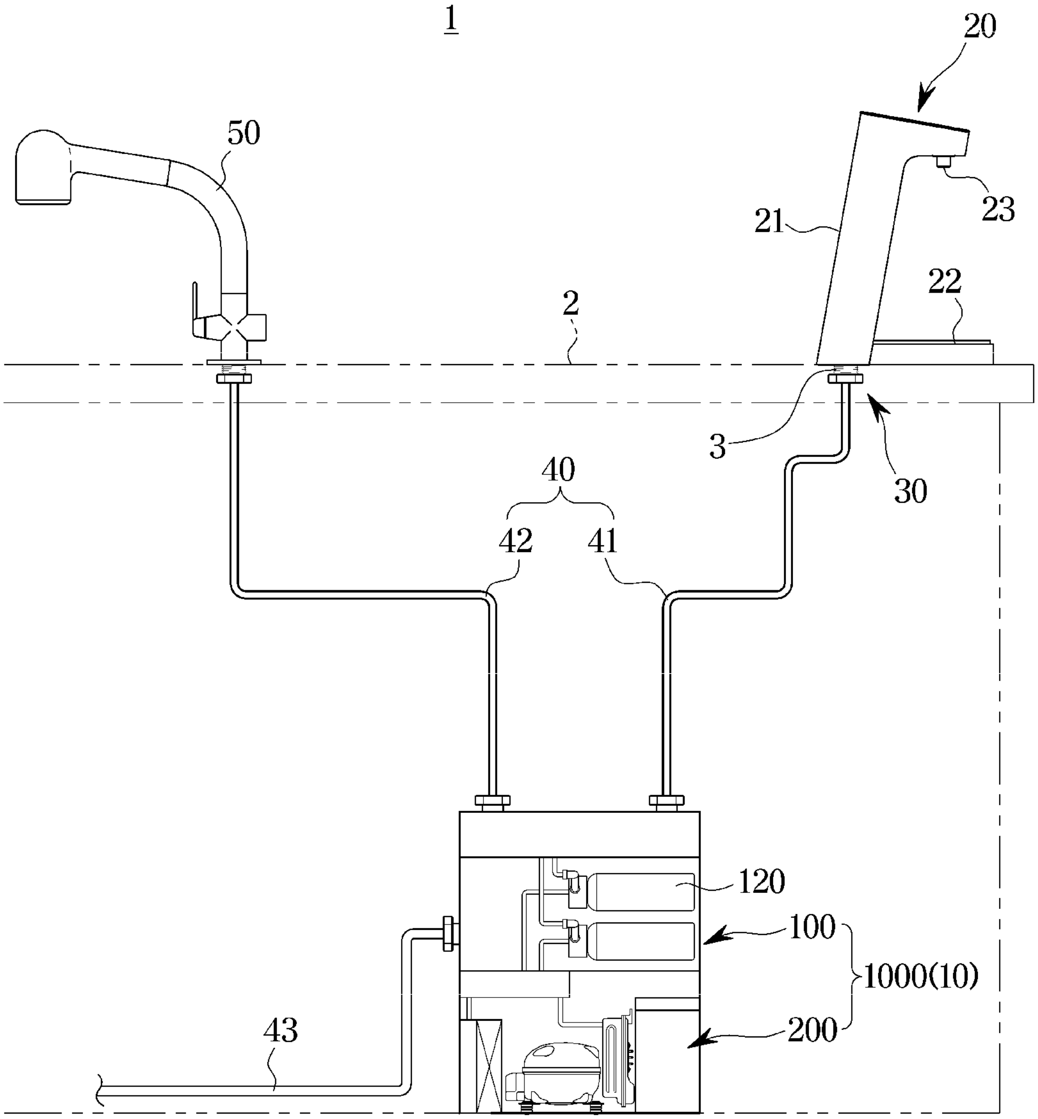
FIG. 1 schematically shows a water purifier according to an embodiment of the disclosure.

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe the embodiments, and are not intended to limit and/or restrict the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Meanwhile, in the following description, the terms "front", "rear", "left", and "right" are defined based on the drawings, and the shapes and positions of the components are not limited by the terms.

More specifically, as shown in FIG. 1, a direction in which an X direction is defined as a front direction, and rear, left, right, up, and down directions are defined based on the front direction.

Hereinafter, an embodiment of the disclosure will be described in detail with reference to the accompanying drawings.

Figure 2:
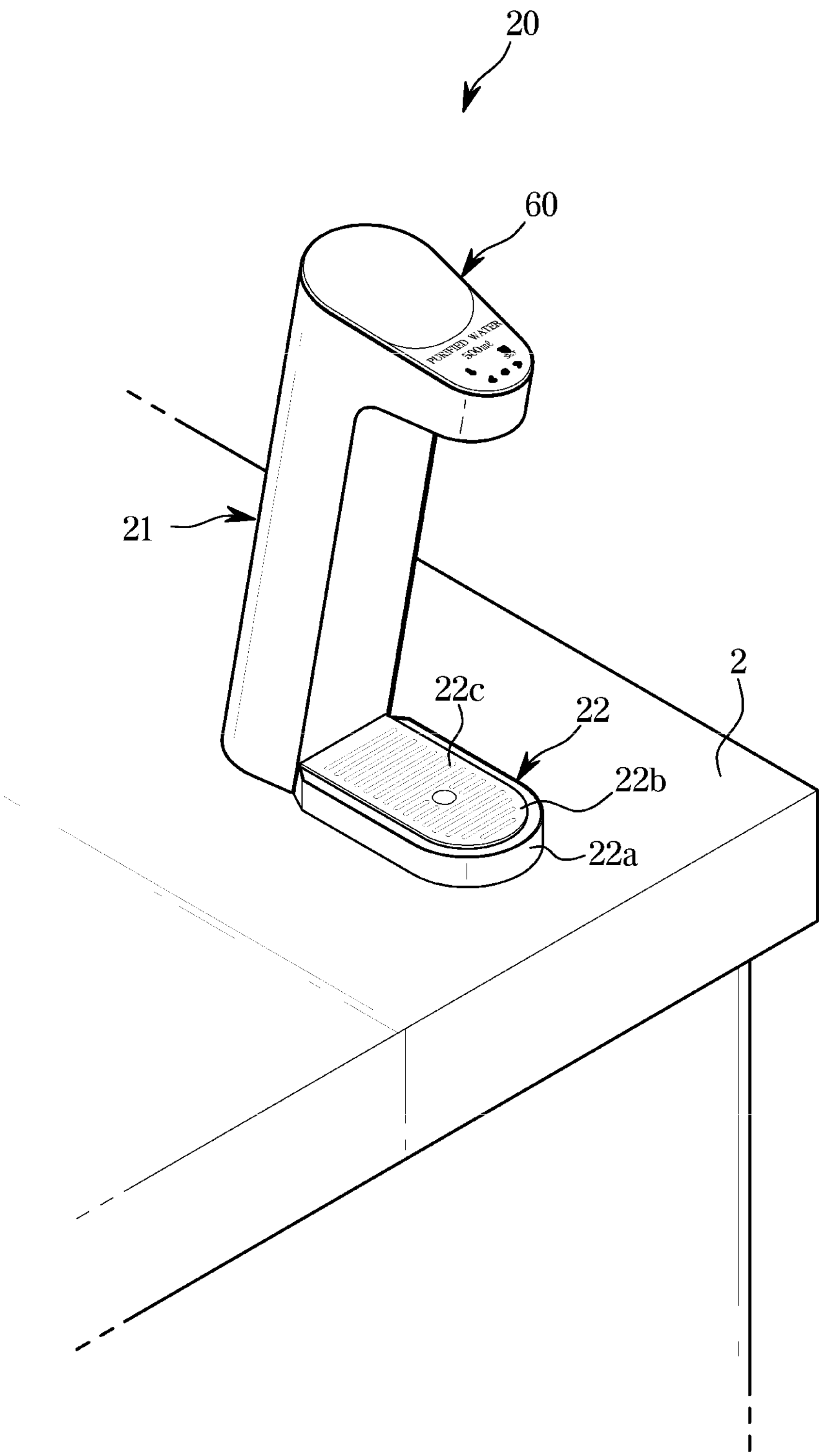
FIG. 2 shows a water supply module in the water purifier shown in FIG. 1.

FIG. 1 schematically shows a water purifier according to an embodiment of the disclosure. FIG. 2 shows a water supply module in the water purifier shown in FIG. 1.

Referring to FIGS. 1 and 2, a water purifier 1 may include a main module 10. The main module 10 may include a first module 1000 and a second module 2000. Details about this will be described below. The first module 1000 may include a filter unit 100 and a cold and hot water unit 200. The filter unit 100 and the cold and hot water unit 200 may be positioned in a lower space of a kitchen countertop 2.

The water purifier 1 may include a water supply module 20. The water supply module 20 may include a water supply nozzle 23 connected to the filter unit 100 and the cold and hot water unit 200 to supply purified water to a user. The water supply module 20 may be installed on the kitchen countertop 2. The water supply module 20 may be rotatably installed on the kitchen countertop 2. The water supply module 20 may be connected to the filter unit 100 and the cold and hot water unit 200 through an external connecting device 40.

The filter unit 100 and the cold and hot water unit 200 may be positioned inside the kitchen countertop 2. The filter unit 100 may include at least one or more filters 120, and the cold and hot water unit 200 may cool or heat water purified by the filter unit 100.

The external connecting device 40 connected to the filter unit 100 and the cold and hot water unit 200 may include at least one or more external pipes 41, 42, and 43. The external pipes 41, 42, and 43 may include a first external pipe 41 connected to the water supply module 20, and a second external pipe 42 connected to a faucet 50 installed in a kitchen sink (not shown). The first external pipe 41 may be connected to a hot water outlet hose 330 and a cold water outlet hose 340 that will be described blow. The second external pipe 42 may be connected to a drinking water hose 350 which will be described below. The filter unit 100 and the cold and hot water unit 200 may receive raw water such as tap water through a third external pipe 43. The third external pipe 43 may be connected to a water inlet hose 310 which will be described below.

In the kitchen countertop 2, an installing portion 3 in which the water supply module 20 is installed may be provided. The installing portion 3 may be formed by opening at least one portion of the kitchen countertop 2. Through the installing portion 3 of the kitchen countertop 2, the first external pipe 41 may be connected to the water supply module 20.

The water supply module 20 may be rotatably installed in the installing portion 3. The water supply module 20 may be rotatably installed in the installing portion 30 through a rotating device 30.

In an embodiment of the disclosure, an example in which an installing portion is formed around a corner of a kitchen countertop is shown, however, a concept of the disclosure is not limited thereto. For example, the installing portion may be formed at various locations where a water supply unit of a water purifier is installed.

The water supply module 20 may include a case 21 forming an outer appearance. The case 21 may include an operation portion 60 for controlling the water purifier 1, and the water supply nozzle 23 for receiving water purified by the filter unit 100 of the water purifier 1 and supplying the water to a user, while interworking with the operation portion 60.

The water supply module 20 may further include a residual water tray 22 provided separately from the case 21. The residual water tray 22 may prevent purified water discharged from the water supply nozzle 23 of the water supply module 20 and then spilled out of a user's cup or bowl from flowing out.

The residual water tray 22 may include a tray body 22*a* formed concavely to store the spilled water, and a tray grill 22*b* provided on the tray body 22*a*. The tray grill 22*b* may include a plurality of slits 22*c* opening to receive water spilled out of a cup or bowl.

The residual water tray 22 may be movable independently from a rotation of the water supply module 20. The residual water tray 22 may be attached to or detached from the case 21 of the water supply module 20. The residual water tray 22 may be positioned to correspond to the water supply nozzle 23 of the water supply module 20. The residual water tray 22 may be positioned below the water supply nozzle 23. At least one side of the residual water tray 22 may be installed in the case 21. The at least one side of the residual water tray 22 may be attached to a front side of the case 21.

A user may couple the cold and hot water unit 200 with the filter unit 100 when a cold and hot water function is needed. In the drawing, only the filter unit 100 and the cold and hot water unit 200 are shown, however, a cold water unit 200*a* and a control unit 400 may be further provided. That is, when only a cold water function is used, the cold water unit 200*a* may be added, instead of the cold and hot water unit 200, and, when a flow control and recognition on a kind of a module are required, the control unit 400 may be added.

The control unit 400 which will be described below may display, on the operation portion 60, whether the water purifier 1 is coupled with only the filter unit 100, both the filter unit 100 and the cold water unit 200*a*, or both the filter unit 100 and the cold and hot water unit 200.

Figure 3:
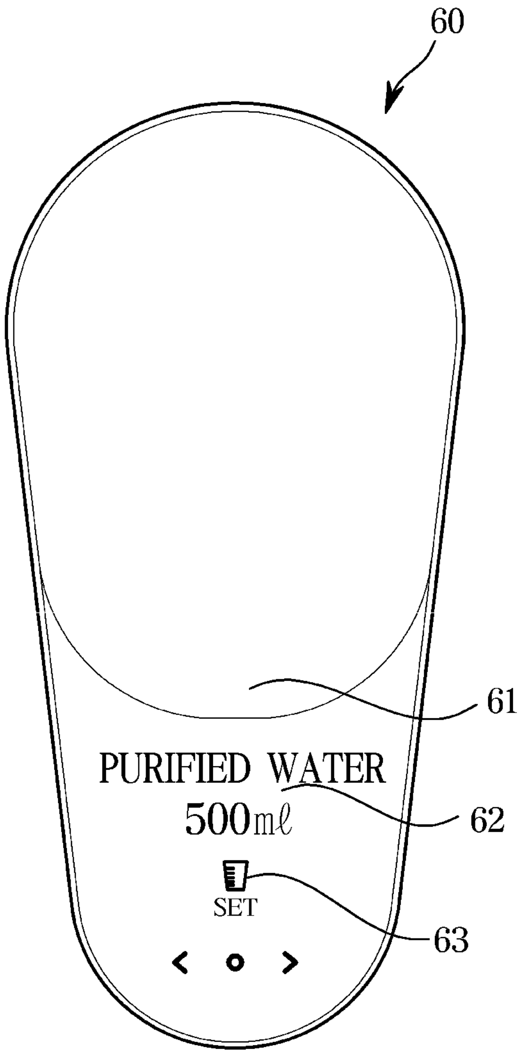
FIG. 3 shows an operation portion of the water purifier shown in FIG. 1 when a filter unit is coupled with the water purifier.
Figure 4:
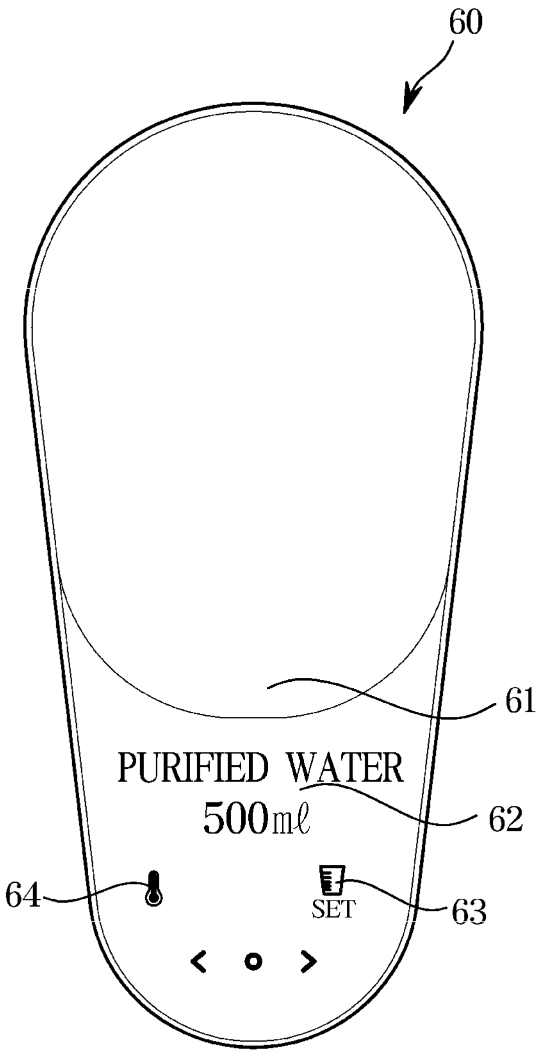
FIG. 4 shows the operation portion of the water purifier shown in FIG. 1 when a cold and hot water unit or a cold water unit is coupled with the water purifier.

FIG. 3 shows an operation portion of the water purifier shown in FIG. 1 when a filter unit is coupled with the water purifier. FIG. 4 shows the operation portion of the water purifier shown in FIG. 1 when a cold and hot water unit or a cold water unit is coupled with the water purifier.

Referring to FIGS. 3 and 4, the operation portion 60 may include a water supply button 61, a display 62, a supply quantity controller 63, and a temperature controller 64.

A user may receive purified water from the nozzle 23 by pressing the water supply button 61 in order to use the water purifier 1. The display 62 may be provided below the water supply button 61. However, a location of the display 62 is not limited to this, and the display 62 may be positioned above the water supply button 61. The display 62 may display a kind and quantity of purified water to be supplied. For example, which one of purified water, cold water, or hot water is supplied and a supply quantity, such as 100 ml, 500 ml, etc., may be displayed. That is, when only the filter unit 100 is coupled, purified water will be displayed on the display 62, and, when the cold and hot water unit 200 or the cold water unit 200*a* is coupled, the temperature controller 64 may be automatically added and displayed, as shown in FIG. 4.

The supply quantity controller 63 may change a supply quantity according to a user's desired quantity of purified water. The user may press the supply quantity controller 63 and then press an arrow button therebelow to change a supply quantity.

The temperature controller 64 may set a user's desired temperature of supply water. The user may press the temperature controller 64 and then press an arrow button therebelow to change temperature of supply water. Although not shown in the drawings, supply water temperature set by a user may be displayed on the display 62.

Figure 5:
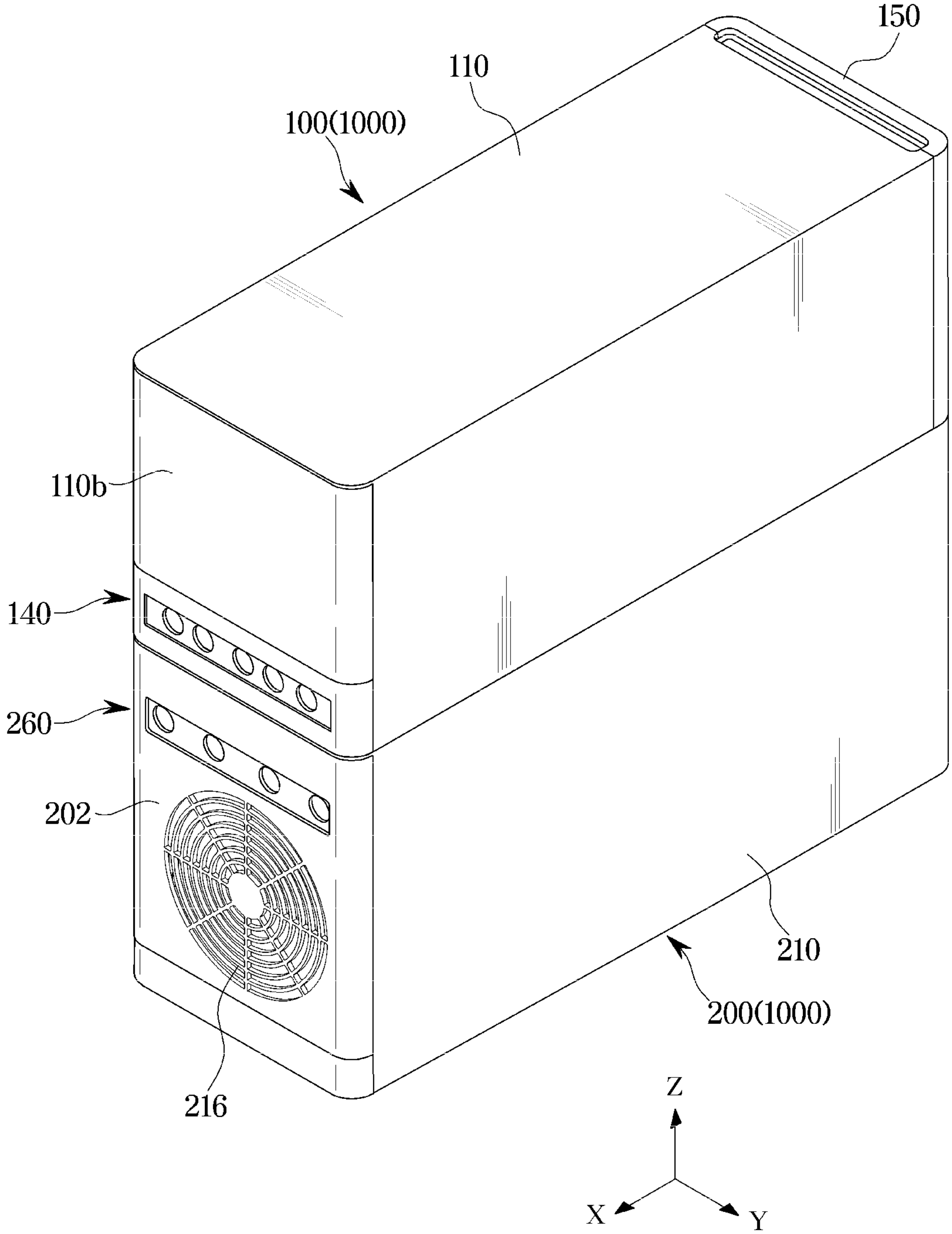
FIG. 5 shows a filter unit and a cold and hot water unit in the water purifier shown in FIG. 1.

FIG. 5 shows a filter unit and a cold and hot water unit in the water purifier shown in FIG. 1.

Referring to FIG. 5, the first module 1000 may include the cold and hot water unit 200 and the filter unit 100. The cold and hot water unit 200 and the filter unit 100 may each form a unit, and may be coupled with each other by a coupling method which will be described below.

The filter unit 100 may include a first case 110 forming an outer appearance, a hose connecting surface 110*b* provided in one surface of the first case 110, a bracket 150 rotatably coupled with the first case 110, and a first inlet and outlet portion 140.

The first case 110 may be provided in a shape of a rectangular parallelepiped. The bracket 150 may be rotatably coupled with a rear side of the first case 110 to open or close the rear side of the first case 110. The bracket 150 may be coupled with the first case 110 through a hinge, etc. provided in a lower portion of the first case 110.

In the hose connecting surface 110*b*, the first inlet and outlet portion 140 may be formed. The first inlet and outlet portion 140 may be formed in the surface that is opposite to the bracket 150.

The bracket 150 may further include a handle (not shown). The handle may enable a user to rotate the bracket 150 and open or close the bracket 150 to thereby take the one or more filters 120 coupled therein out or insert the filters 120 into the filter unit 100.

The first inlet and outlet portion 140 of the filter unit 100 may be formed in the hose connecting surface 110*b* of the first case 110. The first inlet and outlet portion 140 may include at least one water inlet and at least one water outlet.

The cold and hot water unit 200 may include a second case 210 forming an outer appearance, a hose connecting surface 202 provided in one surface of the second case 210, a discharge grill 216, and a second inlet and outlet portion 260.

The second case 210 may be provided in a shape of a rectangular parallelepiped. In one surface of the second case 210, the discharge grill 216 may be formed. The discharge grill 216 may discharge heat generated by the cold and hot water unit 200 through a blow fan 270 which will be described below.

The second inlet and outlet portion 260 of the cold and hot water unit 200 may be formed in the hose connecting surface 202. The second inlet and outlet portion 260 may include at least one water inlet or at least one water outlet.

Figure 6:
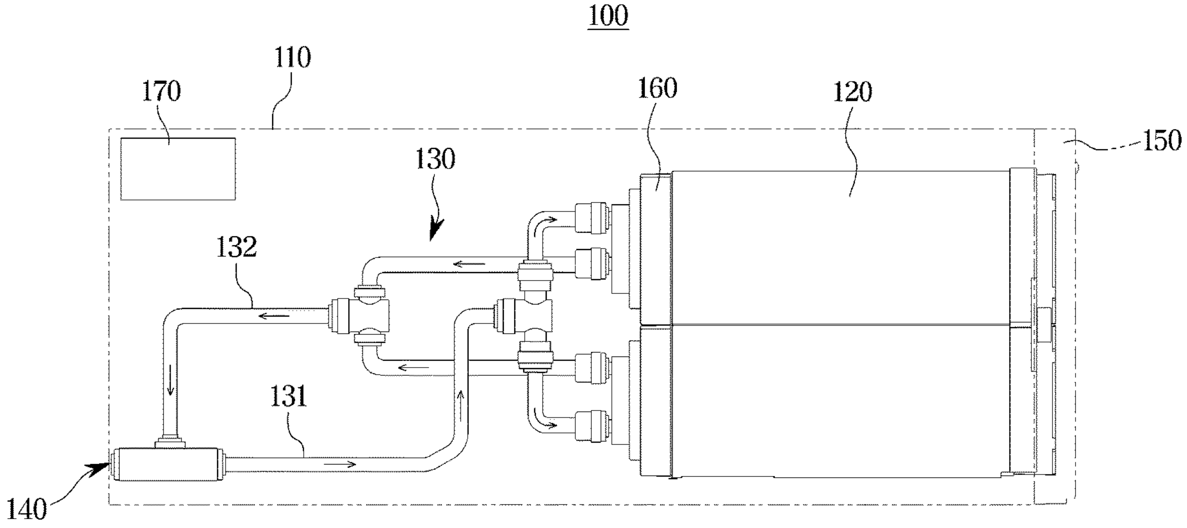
FIG. 6 shows a side of a filter unit in the water purifier shown in FIG. 1.

FIG. 6 shows a side of a filter unit in the water purifier shown in FIG. 1.

Referring to FIG. 6, the filter unit 100 may include the one or more filters 120, and a first internal pipe 130 connecting the filters 120 to the first inlet and outlet portion 140.

The filters 120 may include a preprocessing filter, a membrane filter as a purifying filter, and a post processing filter. The filters 120 may remove a smell and a foreign material from water received through a raw water inlet 141 which will be described below. Also, the filters 120 may give a flavor and aroma to purified water.

Each filter 120 may include a head 160 at one end. The head 160 may be connected to the first internal pipe 130. Also, the head 160 may be coupled with a fixer (not shown) provided on an outer side of the filter 120 to couple the one or more filters 120 thereto.

Water that enters or exits the filters 120 through the first inlet and outlet portion 140 may flow along the first internal pipe 130. The first internal pipe 130 may include a first inlet pipe 131 and a first outlet pipe 132.

The first inlet pipe 131 may cause water received through the first inlet and outlet portion 140 to flow to the filters 120 or to another inlet or outlet of the first inlet and outlet portion 140.

The first outlet pipe 132 may cause water exited the filters 120 to flow to the first inlet and outlet portion 140 or to another filter 120.

The filter unit 100 may further include a controller 170 provided inside the first case 110. The controller 170 may recognize coupling of the cold and hot water unit 200 or the cold water unit 200*a*. Upon coupling of the cold and hot water unit 200 or the cold water unit 200*a*, the controller 170 may cause the display 62 to display the coupling.

Figure 7:
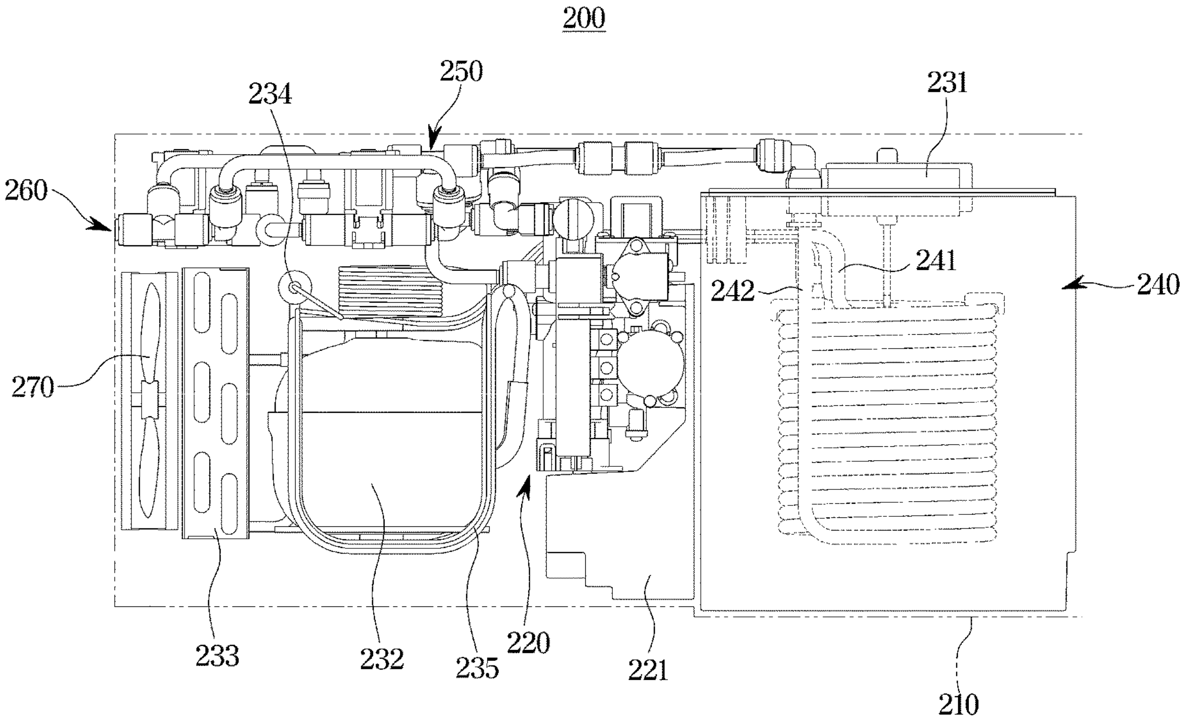
FIG. 7 shows a side of a cold and hot water unit in the water purifier shown in FIG. 1.

FIG. 7 shows a side of a cold and hot water unit in the water purifier shown in FIG. 1.

Referring to FIG. 7, the cold and hot water unit 200 may include a water tank 240, a cooling device 230, and a heater 220.

The cooling device 230 may include a compressor 232, a condenser 233 connected to the compressor 232, an expander 234 connected to the condenser 233, and an evaporator 231 connected to the expander 234 and the compressor 232. The cold and hot water unit 200 may further include a refrigerant tube 235 to enable a refrigerant to flow to individual configurations of the cooling device 230.

The water tank 240 may store water purified through the filter unit 100. In the water tank 240, a refrigerant pipe 241 through which a refrigerant flows and a purified water pipe 242 through which purified water flows may be provided. In the water tank 240, the refrigerant pipe 241 may be positioned at an inner space than the purified water pipe 242.

A refrigerant may flow through the refrigerant pipe 241 to keep water stored in the water tank 240 cold. The refrigerant pipe 241 may be connected to the evaporator 231. Water purified through the filter unit 100 may be stored in the water tank 240 or flow through the purified water pipe 242, and, because the purified water pipe 242 is adjacent to the refrigerant pipe 241, the water included in the purified water pipe 242 may be cooled and then discharged to outside. The evaporator 231 may be provided above the water tank 240 to take away heat from the water stored in the water tank 240. However, a location of the evaporator 231 is not limited to above the water tank 240, and the evaporator 231 may be positioned below or beside the water tank 240.

The heater 220 may be provided to a left side of the water tank 240. The heater 220 may heat water exiting the water tank 240 to provide hot water to a user. The heater 220 may include a ceramic heater. A location of the heater 220 is not limited to the left side of the water tank 240.

Individual configurations of the cooling device 230 and the heater 220 may be positioned inside the second case 210. Accordingly, because the cold and hot water unit 200 is separated from the filter unit 100, the cold and hot water unit 200 may be attached to or detached from the water purifier 1 as necessary.

Locations of the individual configurations of the cooling device 230 and the heater 220 are not limited to the shown locations as long as the individual configurations of the cooling device 230 and the heater 220 are positioned inside the second case 210, and the individual configurations of the cooling device 230 and the heater 220 may be arranged at various locations.

The cold and hot water unit 200 may further include the blow fan 270 for discharging inside heat of the second case 210. The blow fan 270 may be adjacent to the condenser 233. Because the blow fan 270 discharges inside heat of the second case 210 to the outside, the configurations of the cold and hot water unit 200 may be not overheated.

The cold and hot water unit 200 may further include a second internal pipe 250. The second internal pipe 250 may discharge purified water cooled and heated by the evaporator 231 and the heater 220 through the second inlet and outlet portion 260. Also, purified water discharged from the filter unit 100 may enter the cold and hot water unit 200 through the second inlet and outlet portion 260 and be stored in the water tank 240.

The cold and hot water unit 200 may further include a support member 221 provided below the heater 220. The support member 221 may be positioned inside the second case 210. The support member 221 may prevent the heater 220 from being greatly damaged although the heater 220 falls down, and may fill an empty space in the second case 210 to prevent the other configurations from being damaged due to movements.

Figure 8:
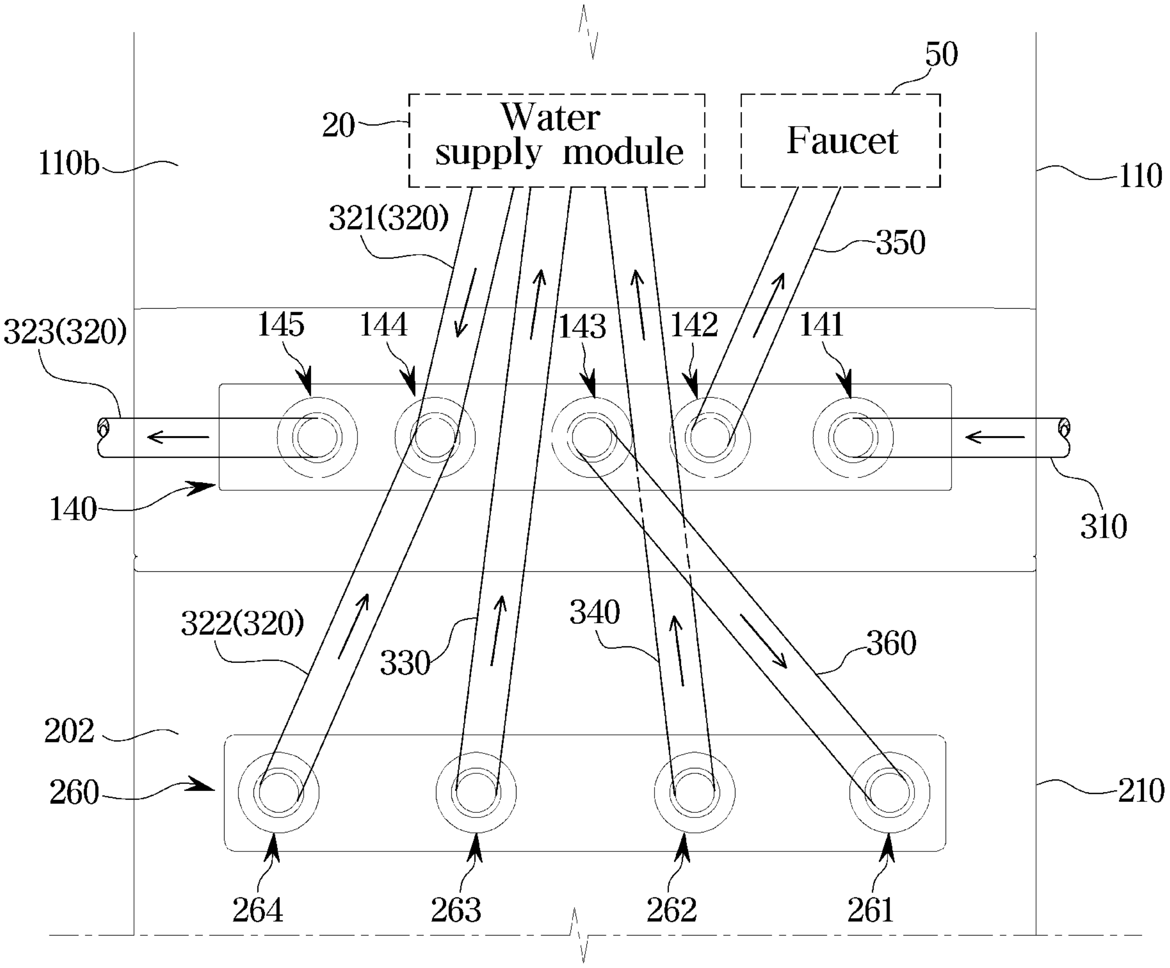
FIG. 8 shows a connection relationship between a first inlet and outlet portion and a second inlet and outlet portion in the water purifier shown in FIG. 1.

FIG. 8 shows a connection relationship between a first inlet and outlet portion and a second inlet and outlet portion in the water purifier shown in FIG. 1.

Referring to FIG. 8, the water purifier 1 may include the faucet 50 and a connecting hose 300. In the hose connecting surface 110*b* of the first case 110, the first inlet and outlet portion 140 may be formed, and in the hose connecting surface 202 of the second case 210, the second inlet and outlet portion 260 may be formed.

The faucet 50 may be provided outside the first case 110 and the second case 210.

The connecting hose 300 may include the water inlet hose 310, a drain hose 320, the hot water outlet hose 330, the cold water outlet hose 340, the drinking water hose 350, and a middle hose 360. The drain hose 320 may include a first drain hose 321, a second drain hose 322, and a third drain hose 323.

The first inlet and outlet portion 140 may include the raw water inlet 141, a drinking water outlet 142, a first purified water outlet 143, a drain inlet 144, and a drain outlet 145. The second inlet and outlet portion 260 may include a purified water inlet 261, a second purified water outlet 262, a hot water outlet 263, and a drain outlet 264.

The individual configurations of the first inlet and outlet portion 140 may be connected to the first internal pipe 130 in the first case 110 to receive water or supply water to the first internal pipe 130. The raw water inlet 141 may receive raw water through the water inlet hose 310. Raw water may enter the first case 110 through the raw water inlet 141, and be filtered through the first internal pipe 130 and the filter 120. The drinking water outlet 142 may be adjacent to the raw water inlet 141, and discharge water to the faucet 50 through the drinking water hose 350. The first purified water outlet 143 may be connected to the purified water inlet 261 of the second inlet and outlet portion 260 through the middle hose 360 to store purified water filtered by the filter 120 in the water tank 240 inside the second case 210. The drain inlet 144 may receive water drained from the water supply module 20 through the first drain hose 321. Also, the drain inlet 144 may be connected to the drain outlet 264 through the second drain hose 322 to discharge drainage water that is to be drained from the cold and hot water unit 200. The drain outlet 145 may be connected to the third drain hose 323 to drain the drainage water to the outside.

The individual configurations of the second inlet and outlet portion 260 may be connected to the second internal pipe 250 in the second case 210 to receive water or supply water to the second internal pipe 250. Purified water filtered by the filter unit 100 may pass the middle hose 360 through the first purified water outlet 143 and then enter the purified water inlet 261. The second purified water outlet 262 may supply cold water or purified water to the water supply module 20 through the cold water outlet hose 340. The hot water outlet 263 may supply hot water to the faucet 50 through the hot water outlet hose 330. In this case, the hot water outlet hose 330 may include a hose capable of being used at high temperature. The drain outlet 264 may send drainage water discharged from the cold and hot water unit 200 to the drain inlet 144 of the first inlet and outlet portion 140 through the second drain hose 322.

The locations of the above-described individual configurations of the hoses and the inlet and outlet portions are not limited to these, and the locations of the inlets and outlets may be arranged by various methods. Some of the above-described hoses and inlet and outlet portions may be omitted.

Figure 9:
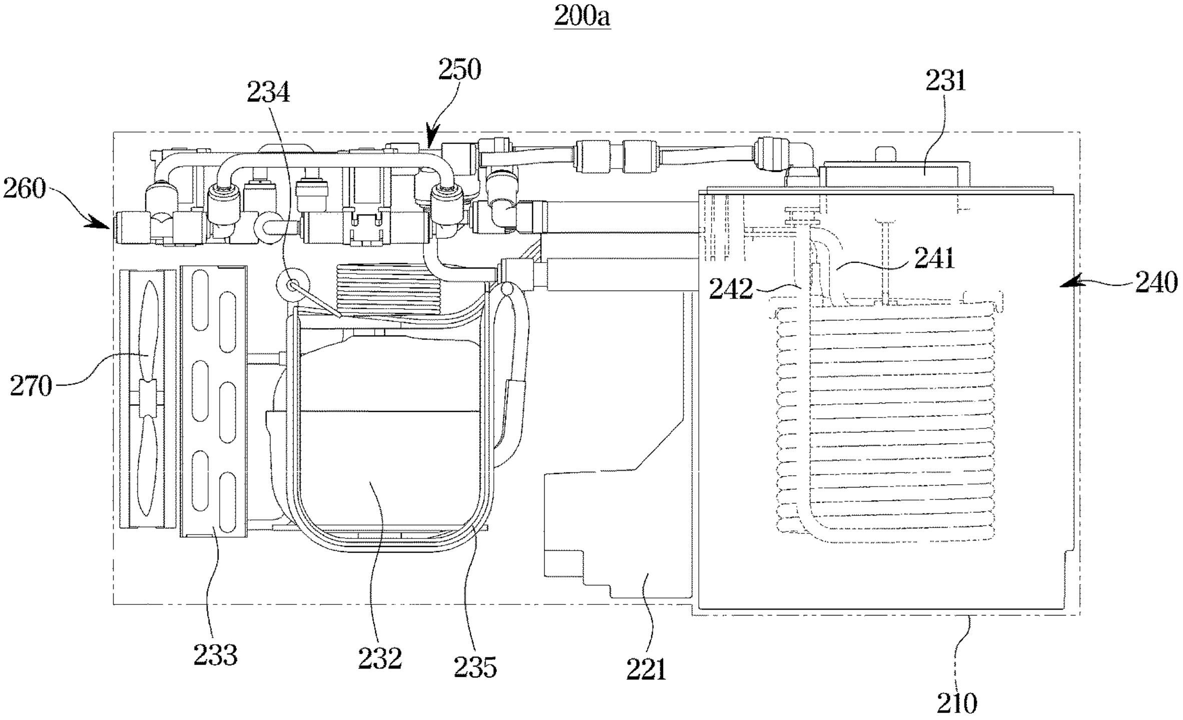
FIG. 9 shows a side of a cold water unit in a water purifier according to another embodiment of the disclosure.
Figure 10:
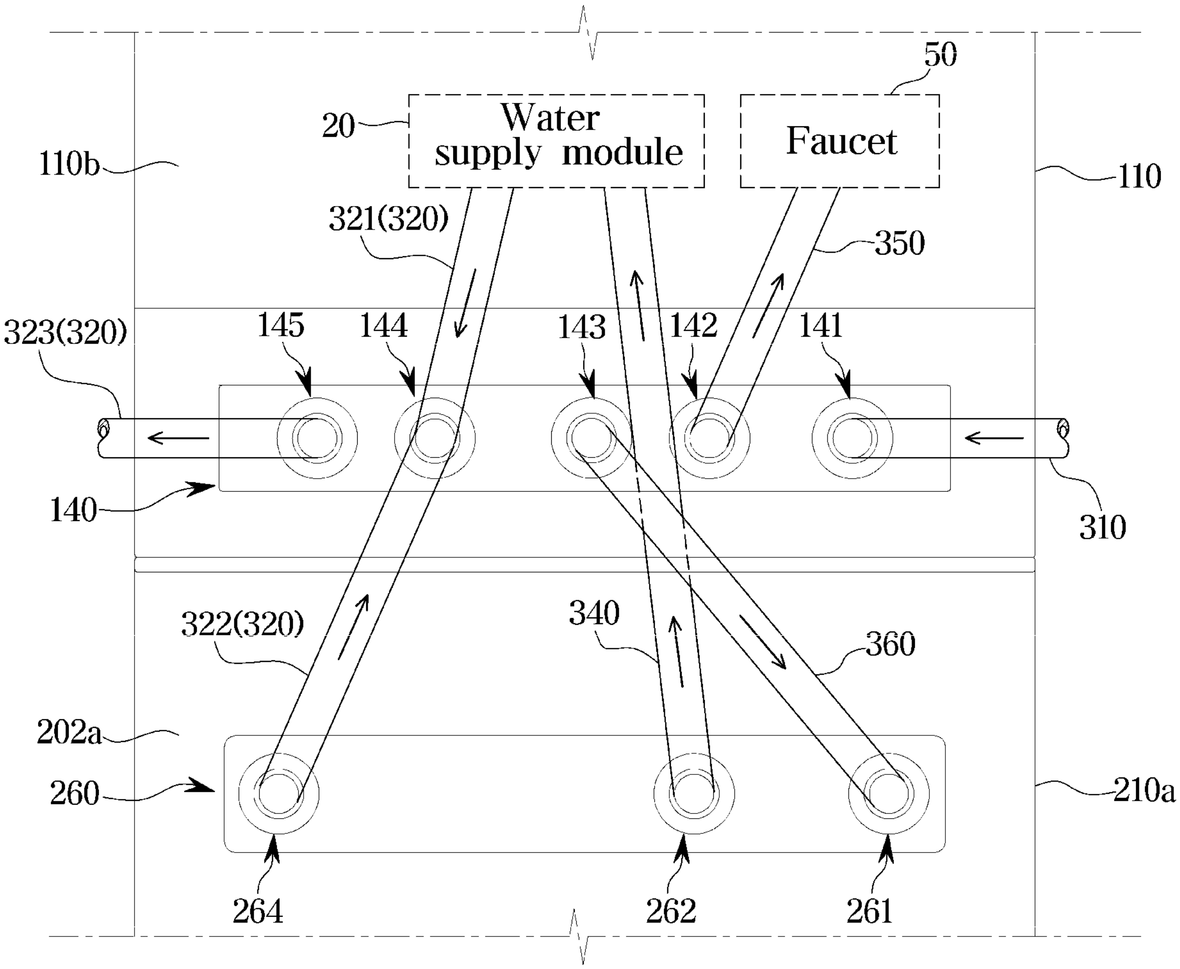
FIG. 10 shows a connection relationship between a first inlet and outlet portion and a second inlet and outlet portion in the water purifier shown in FIG. 9.

FIG. 9 shows a side of a cold water unit in a water purifier according to another embodiment of the disclosure. FIG. 10 shows a connection relationship between a first inlet and outlet portion and a second inlet and outlet portion in the water purifier shown in FIG. 9.

Referring to FIGS. 9 and 10, the water purifier 1 may further include the cold water unit **200*a*. The cold water unit 200*a* may be a configuration in which the heater 220 and the related internal pipe are omitted from the cold and hot water unit 200. As shown in FIG. 10, in a second case 210*a* of the cold water unit 200*a*, the hot water outlet 263 may be omitted. Also, the hot water outlet hose 330** may be omitted.

That is, the first inlet and outlet portion 140 may be formed in a hose connection surface **110*b* of the first case 110, and the second inlet and outlet portion 260 may be formed in a hose connecting surface 202*a* of the second case 210*a***.

When a user does not need hot water, the cold water unit **200*a*, instead of the cold and hot water unit 200, may be coupled with the filter unit 100 and used. Also, when the cold water unit 200*a* is coupled, the control unit 400 which will be described below may recognize the coupling, and the coupled module may be automatically displayed on the operation portion 60**.

Figure 11:
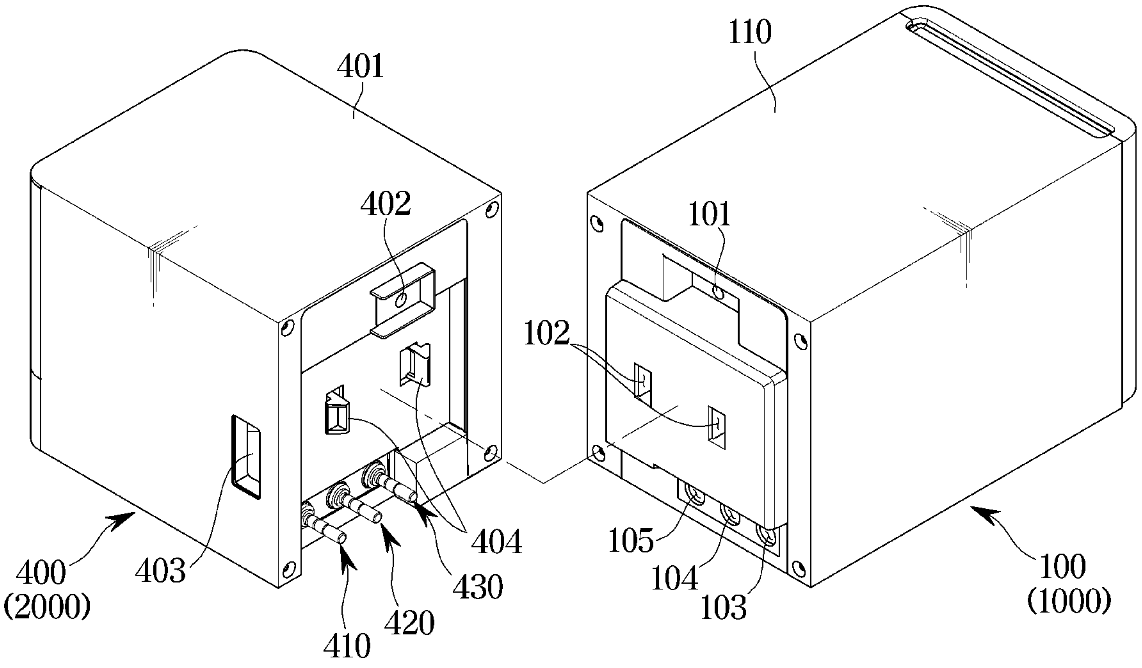
FIG. 11 shows a coupling relationship between a control unit and a filter unit in a water purifier according to another embodiment of the disclosure.
Figure 12:
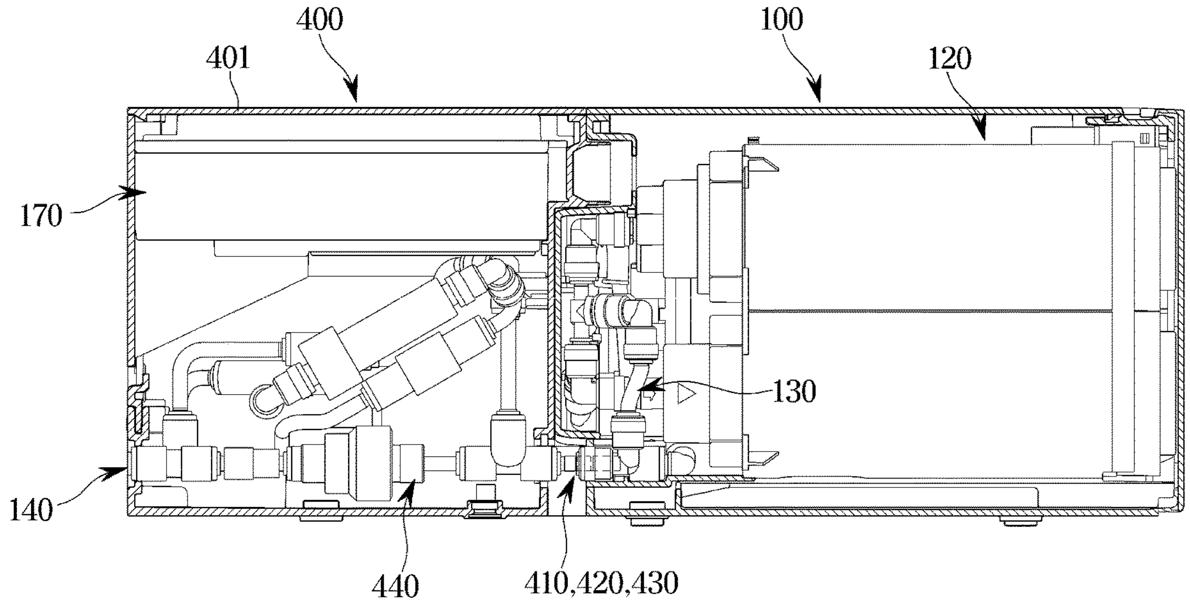
FIG. 12 shows sides of the control unit and the filter unit in the water purifier shown in FIG. 11.
Figure 13:
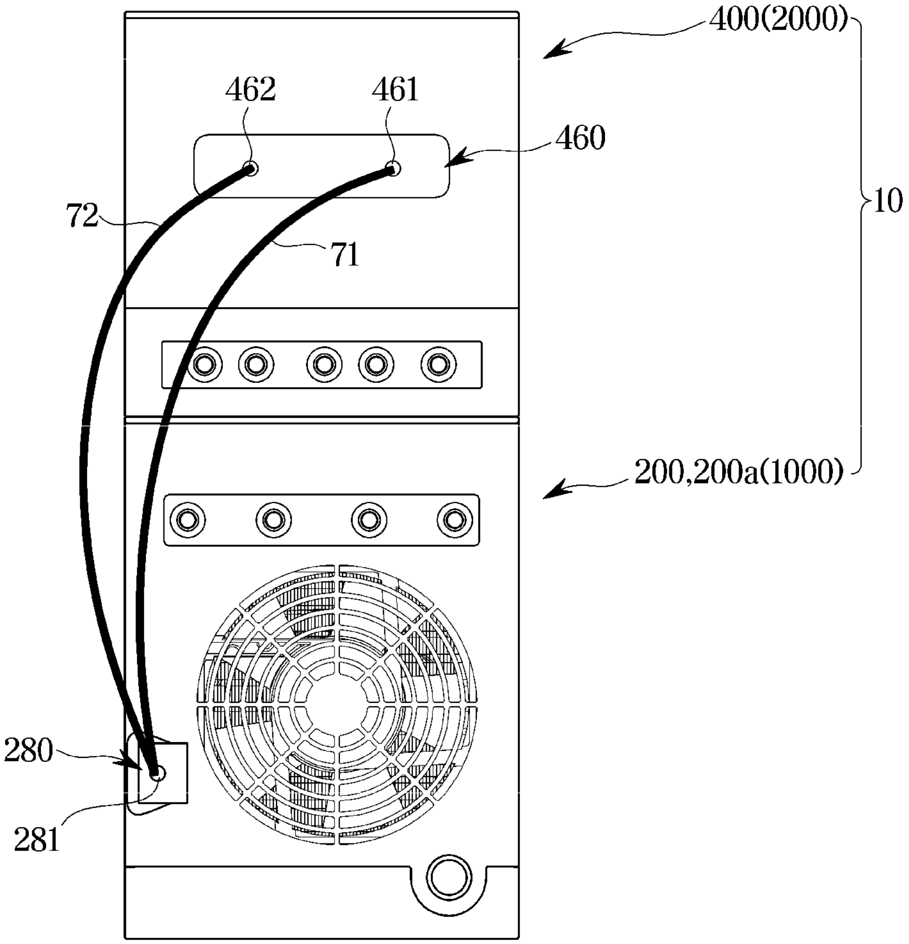
FIG. 13 shows a connection relationship between the control unit and the filter unit in the water purifier shown in FIG. 11.

FIG. 11 shows a coupling relationship between a control unit and a filter unit in a water purifier according to another embodiment of the disclosure. FIG. 12 shows sides of the control unit and the filter unit in the water purifier shown in FIG. 11. FIG. 13 shows a connection relationship between the control unit and the filter unit in the water purifier shown in FIG. 11. In FIG. 13, descriptions about the inlet and outlet portions 140 and 260 and the discharge grill 216 are omitted.

Referring to FIGS. 11 to 13, the water purifier 1 may include the second module 2000. The second module 2000 may include the control unit 400. The control unit 400 may include a third case 401 forming an outer appearance, an input and output port 101, a push button 403, and a module coupling protrusion 404. Also, the control unit 400 may include the controller 170 provided inside the third case 401. That is, according to another embodiment of the disclosure, the controller 170 may be positioned inside the third case 401, instead of the first case 110. The filter unit 100 may further include the input and output port 101, a module coupling groove 102, a raw water connecting hole 103, a purified water connecting hole 104, and a drainage water connecting hole 105.

The water purifier 1 may further include a raw water connecting hose 410, a purified water connecting hose 420, and a drainage water connecting hose 430 for connecting the filter unit 100 to the control unit 400. In the drawing, the hoses are shown to be coupled with the control unit 400, however, the hoses may be coupled with the filter unit 100. That is, the raw water connecting hole 103 may be connected to the raw water connecting hose 410, the purified water connecting hole 104 may be connected to the purified water connecting hose 420, and the drainage water connecting hole 105 may be connected to the drainage water connecting hose 430. A material of the raw water connecting hose 410, the purified water connecting hose 420, and the drainage water connecting hose 430 is not limited, and may include various materials.

The water purifier 1 may include the input and output port 101, a second input and output port 402, a first connector 280, and a second connector 460.

The first input and output port 101 may be formed in the first case 110. The first input and output port 101 may be connected to the second input and output port 402, and automatically recognize coupling of the cold and hot water unit 200 or the cold water unit **200*a* with the control unit 400. That is, when the first input and output port 101 is electrically connected to the second input and output port 402, the controller 170 may recognize the electrical connection and sense a connection between the control unit 400 and one of the cold and hot water unit 200 or the cold water unit 200*a*. Also, the controller 170 may identify a kind of a unit coupled with the control unit 400 and display the kind on the display 62**.

The second input and output port 402 may be provided in the third case 401. The second input and output port 402 may recognize a user's operation of opening the filter unit 100 to take a filter out. That is, the second input and output port 402 may be connected to the first input and output port 101 formed in the first case 110 through a wire to sense whether the filter unit 100 opens.

Each of the cold and hot water unit 200 and the cold water unit **200*a* may include the first connector 280. The first connector 280 may be formed in an outer surface of the second case 210 and 210*a*. That is, the first connector 280 may be formed in the hose connecting surface 202 and 202*a* of the second case 210 and 210*a*, although not limited thereto. However, the first connector 280 may be formed in both side surfaces or a rear surface of the second case 210 and 210*a*. The first connector 280 may include a connection port 281 connected to a direct current port 461 and an alternating current port 462** through a wire.

The control unit 400 may include the second connector 460. The second connector 460 may be formed in an outer surface of the third case 401. That is, the second connector 460 may be formed in the hose connecting surface **110*b* of the third case 401, although not limited thereto. The second connector 460 may be formed in both side surfaces or a rear surface of the third case 401. The second connector 460 may include a plurality of ports 461 and 462. The plurality of ports 461 and 462 may include a direct current port 461 and an alternating current port 462. The water purifier 1 may further include a plurality of wires 71 and 72 for electrically connecting the control unit 400 to the cold and hot water unit 200 or the cold water unit 200***a*. The plurality of wires 71 and 72 may include a direct current wire 71 and an alternating current wire 72. However, kinds of the wires are not limited to the direct current wire 71 and the alternating current wire 72, and the wires may include various kinds of wires. The direct current wire 71 may be connected to the direct current port 461, and the alternating current wire 72 may be connected to the alternating current port 462.

When the cold and hot water unit 200 or the cold water unit 200*a* is coupled with the control unit 400, the control unit 400 may sense the coupling through a wire connection. At this time, the display 62 of the above-described operation portion 60 may change, and the temperature controller 64 may be displayed differently according to whether the cold and hot water unit 200 or the cold water unit 200*a* is coupled with the control unit 400.

The push button 403 may be provided in a side surface of the third case 401. The push button 403 may be connected to the module coupling protrusion 404. The push button 403 may move, upon coupling and separating of the first case 110 and the third case 401, the module coupling protrusion 404 to couple/separate the module coupling protrusion 404 with/from the module coupling groove 102. That is, the module coupling protrusion 404 may be provided in a shape corresponding to the module coupling groove 102. Also, the module coupling protrusion 404 may be inclined. In the drawing, the push button 403 is shown to be formed in one side surface of the third case 401, however, the push button 403 may be also provided in the other side surface. That is, the push button 403 may be formed in both side surfaces of the third case 401.

Because the control unit 400 is coupled with or separated from the filter unit 100, only the filter unit 100 may be used when the control unit 400 is not needed. For example, when a quantity or temperature of filtered, purified water needs not to be adjusted, only the filter unit 100 may be used. Also, when the water purifier 1 is used in another apparatus such as a refrigerator, the control unit 400 may be omitted and only the filter unit 100 may be used, although not limited thereto. However, both the control unit 400 and the filter unit 100 may be installed in the apparatus. The control unit 400 may include a third internal pipe 440 and the controller 170. That is, the controller 170 may be positioned in the third case 401, instead of the first case 110. The third internal pipe 440 may be provided inside the third case 410 to enable water entered or discharged from the first inlet and outlet portion 140 to flow to the filter unit 100.

The controller 170 may be provided inside the third case 401 to control the filter unit 100 and the cold and hot water unit 200. That is, a quantity of hot water or cold water that is received and discharged may be controlled.

When power is supplied after the control unit 400 is coupled with the filter unit 100, the controller 170 may recognize the cold and hot water unit 200 and the cold water unit 200*a*. Accordingly, which one of the cold and hot water unit 200 or the cold water unit 200*a* is coupled may be displayed on the operation portion 60. Also, even when only the filter unit 100, instead of the cold and hot water unit 200 and the cold water unit 200*a*, is coupled, the operation portion 60 may display the filter unit 100. That is, the operation portion 60 may automatically display the coupled module.

As such, the embodiments of the disclosure may be used as a water purifier with added performance by coupling individual modules thereto.

The filter unit 100 may be used as a machine type water purifier being incapable of adjusting a quantity of water by directly connecting to the first pipe 41 and the second pipe 42, and the filter unit 100 may be used independently without the control unit 400. Or, the filter unit 100 may be used as a water purifier being capable of being electrically controlled to adjust a quantity of water to be purified by connecting to the control unit 400. Also, the cold and hot water unit 200 or the cold water unit 200*a* may be coupled with the above-described configuration to be used as a cold water purifier or a cold and hot water purifier. That is, a user may upgrade functions only by additionally coupling modules.

Also, the second connector 460 according to the above-described embodiment may be applied to the filter unit 100 according to the embodiment shown in FIG. 5. That is, the filter unit 100 may also include the second connector 460. In this case, even when the controller 170 is positioned inside the first case 110, the second connector 460 may be connected to the first connector 280.

Accordingly, the controller 170 may recognize a connection between the filter unit 100 and one of the cold water unit 200*a* or the cold and hot water unit 200, and display the connection on the display 62.

Figure 14:
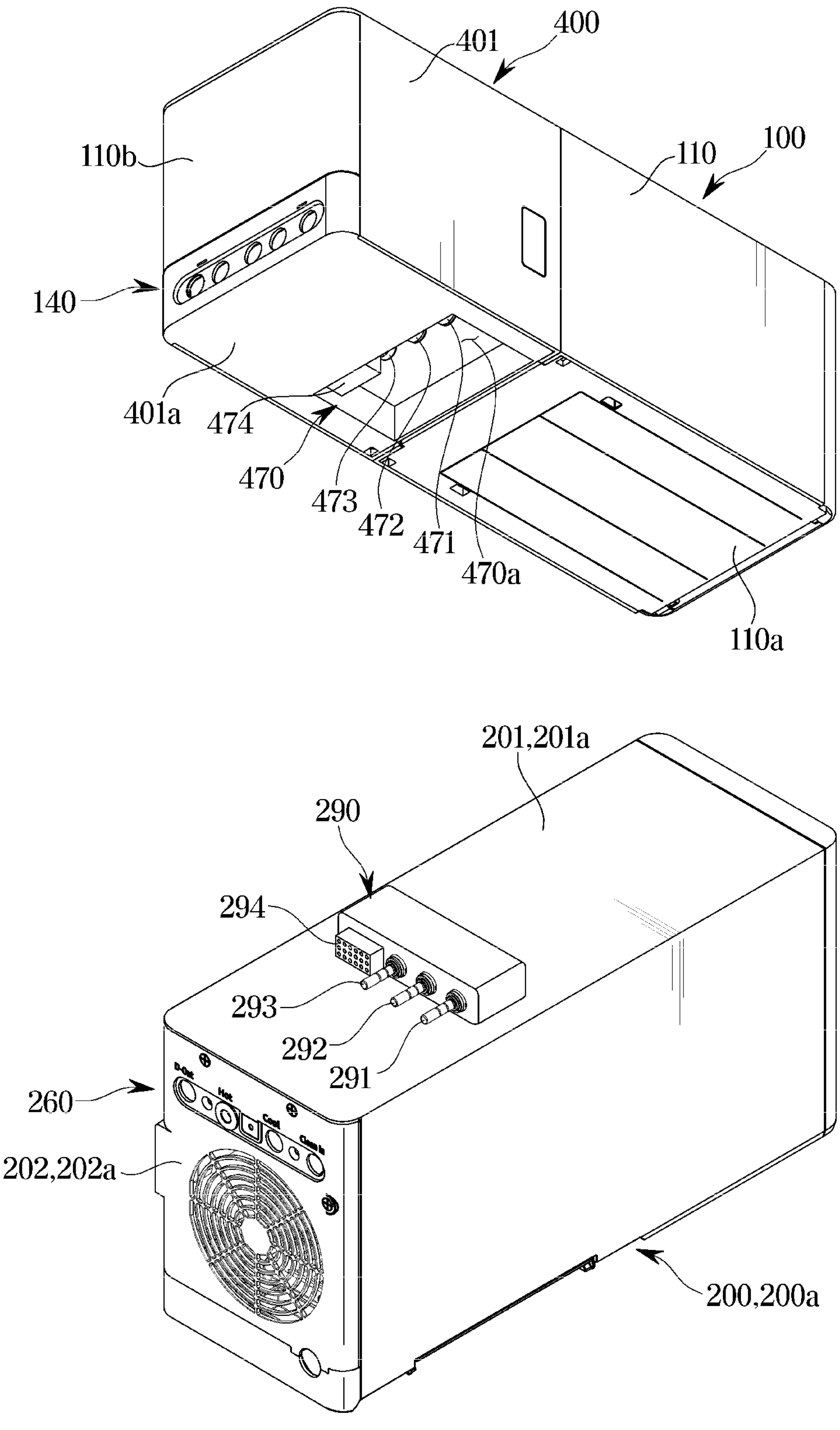
FIG. 14 shows a coupling relationship between a filter unit and a cold and hot water unit in a water purifier according to another embodiment of the disclosure.
Figure 15:
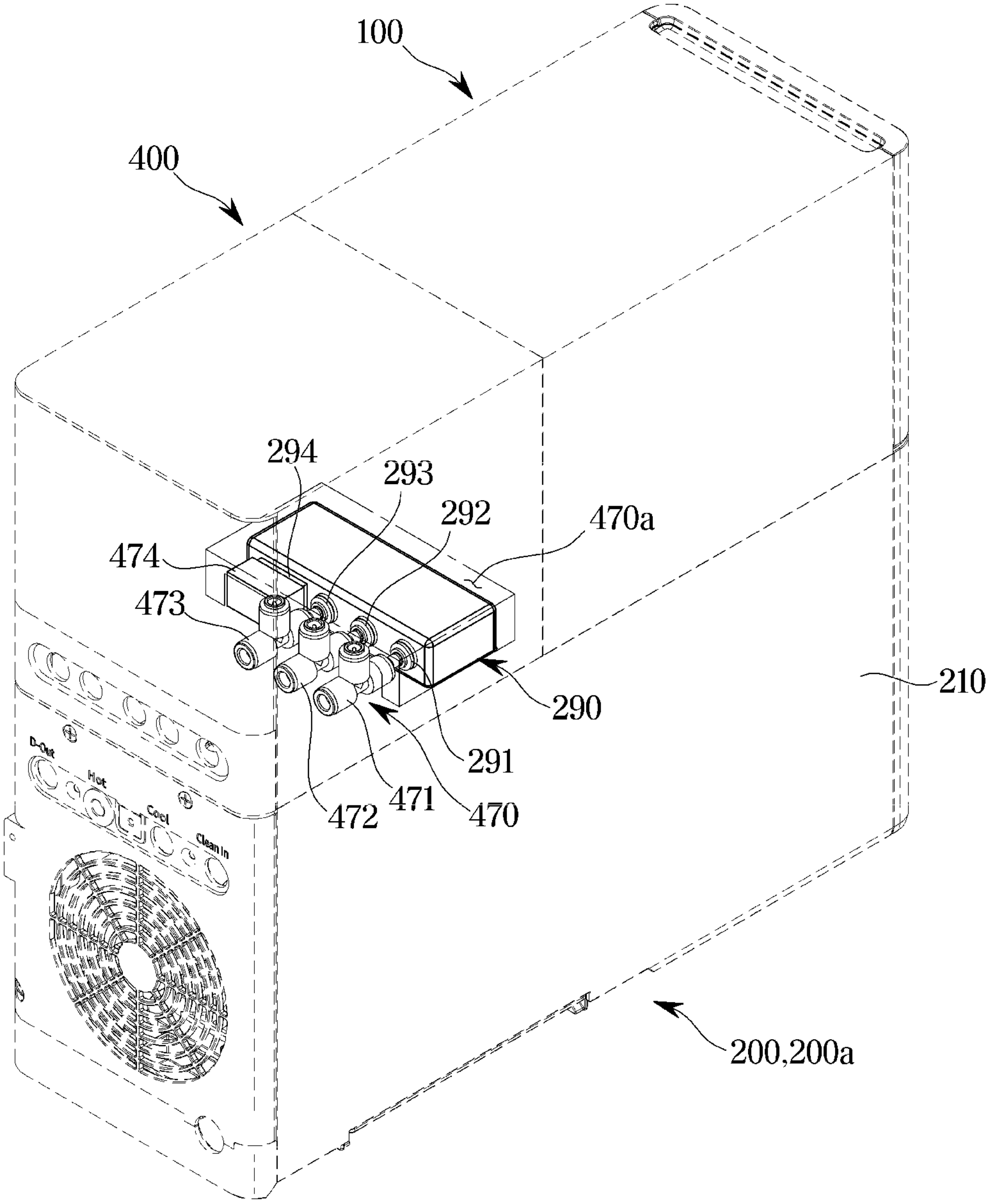
FIG. 15 shows a coupled state of the filter unit and the cold and hot water unit in the water purifier shown in FIG. 14.

FIG. 14 shows a coupling relationship between a filter unit and a cold and hot water unit in a water purifier according to another embodiment of the disclosure. FIG. 15 shows a coupled state of the filter unit and the cold and hot water unit in the water purifier shown in FIG. 14.

Referring to FIGS. 14 and 15, the first case 110 may include a filter case 110. The second case 210 and 210*a* may include a cold water case 210*a* and a cold and hot water case 210. The third case 401 may include a control case 401.

The water purifier 1 may include a first connecting portion 470 and a second connecting portion 290. That is, the control unit 400 may include the first connecting portion 470, and the cold water unit 200*a* or the cold and hot water unit 200 may include the second connecting portion 290.

At least one portion of the first connecting portion 470 may be depressed from a coupling surface 401*a* of the control case 401 with respect to the cold water case 210*a* or the cold and hot water unit 210. That is, at least one portion of the first connecting portion 470 may be formed in a connecting area 470*a* formed by being depressed from a lower surface 401*a* of the control case 401. In this case, the control case 401 may be slidingly coupled with the cold and hot water unit 200 or the cold water unit 200*a*.

However, although not shown in the drawings, at least one portion of the first connecting portion 470 may be formed in an area formed by being depressed from a lower surface 110*a* of the filter case 110. In this case, the filter case 110 may be slidingly coupled with the cold and hot water unit 200 or the cold water unit 200*a*.

The second connecting portion 290 may be formed by protruding from a coupling surface 201 or 201*a* of the cold water case or the cold and hot water case with respect to the control case 401. That is, the second connecting portion 290 may be formed by protruding from an upper surface 201 or 201*a* of the cold water case 210*a*. Also, features of the second connecting portion 290 may be applied in the same way to the cold and hot water unit 200, as well as the cold water unit 200*a*. Accordingly, the second connecting portion 290 may be formed by protruding from the upper surface 201 of the cold and hot water case 210.

Because the first connecting portion 470 and the second connecting portion 290 are formed by being depressed and protruding from the coupling surfaces 401*a*, 201, and 201*a* of the corresponding cases, purified water, hot water, or cold water may flow without installing separate pipes and hoses on the outer surfaces of the respective cases. Accordingly, space utilization of the water purifier 1 may increase.

The first connecting portion 470 may include a purified water outlet 471, a hot water inlet 472, a cold water inlet 473, and a first connector 474. The purified water outlet 471, the hot water inlet 472, the cold water inlet 473, and the first connector 474 may protrude from the connecting area 470*a*.

The purified water outlet 471 may discharge water purified by the filter 120 provided inside the filter case 110 to the cold water unit 200*a* or the cold and hot water unit 200 to cool or heat the water. The purified water outlet 471 may be connected to a purified water inlet 291 provided above the cold and hot water case 210 or the cold water case 210*a*.

According to another embodiment of the disclosure, the purified water outlet 471 may function as the first purified water outlet 143 and the second purified water outlet 262 shown in FIGS. 8 and 10. Accordingly, by minimizing the number of separate hoses connected from the hose connecting surfaces 110*b*, 202, and 202*a* of the respective cases, space utilization may increase.

The hot water inlet 472 may cause water heated by the heater 220 provided in the cold and hot water case 210 to flow to the control case 401. The hot water inlet 472 may be connected to a hot air outlet 292 provided above the cold and hot water case 210. Accordingly, as shown in FIG. 1, water entered the control case 401 may flow to the water supply module 20 through the first external pipe 41. The hot water inlet 472 may be provided when the cold and hot water case 210 is positioned below the control case 401, and, when the cold water case 210*a* is positioned below the control case 401, the hot water inlet 472 may be not provided.

The cold water inlet 473 may cause water cooled by the evaporator 231 provided inside the cold and hot water case 210 or the cold water case 210*a* to flow to the control case 401. The cold water inlet 473 may be connected to a cold water outlet 293 provided in the cold and hot water case 210 or the cold water case 210. Accordingly, as shown in FIG. 1, water entered the control case 401 may flow to the water supply module 20 through the first external pipe 41.

The first connector 474 may be connected to a second connector 294. The first connector 474 and the second connector 294 may transfer an electrical signal including DC current or AC current to each other. Thereby, at least one operation of the compressor 232, a cooling cycle, or a heating cycle may be controlled.

The second connecting portion 290 may include the purified water inlet 291, the hot air outlet 292, the cold water outlet 293, and the second connector 294. The purified water inlet 291, the hot air outlet 292, the cold water outlet 293, and the second connector 294 may protrude from the connecting area 470*a*.

The purified inlet 291 may be connected to the purified water outlet 471 provided in the control case 401. The hot water outlet 292 may be connected to the hot water inlet 472 provided in the control case 401. The cold water outlet 293 may be connected to the cold water inlet 473 provided in the control case 401. The purified water inlet 291 may function as the purified water inlet 261 shown in FIGS. 8 and 10.

Therefore, according to an embodiment of the disclosure, the purified water outlet 471, the hot water inlet 472, the cold water inlet 473, and the first connector 474 may be positioned in the connecting area 470*a* depressed from the lower surface 401*a* of the control case 401, and the purified water inlet 291, the hot air outlet 292, the cold water outlet 293, and the second connector 294 may be formed to correspond to the connecting area 470*a* in the upper surface 210 or 210*a* of the cold and hot water case or the cold water case. Accordingly, by minimizing the number of separate hoses connected from the outer surfaces of the respective cases, space utilization may increase.

Figure 16:
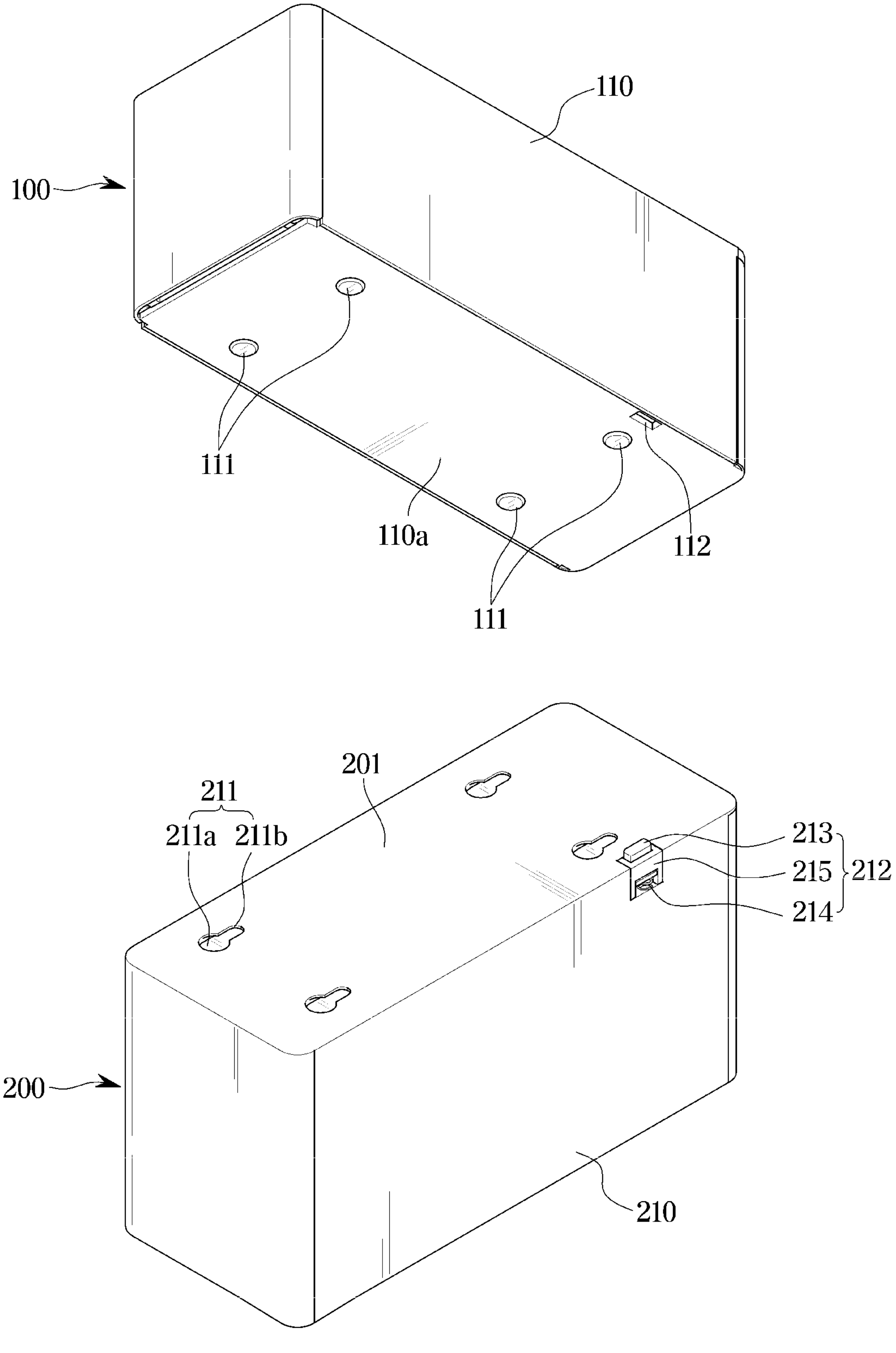
FIG. 16 shows a coupling relationship between the filter unit and the cold and hot water unit in the water purifier shown in FIG. 1.
Figure 17:
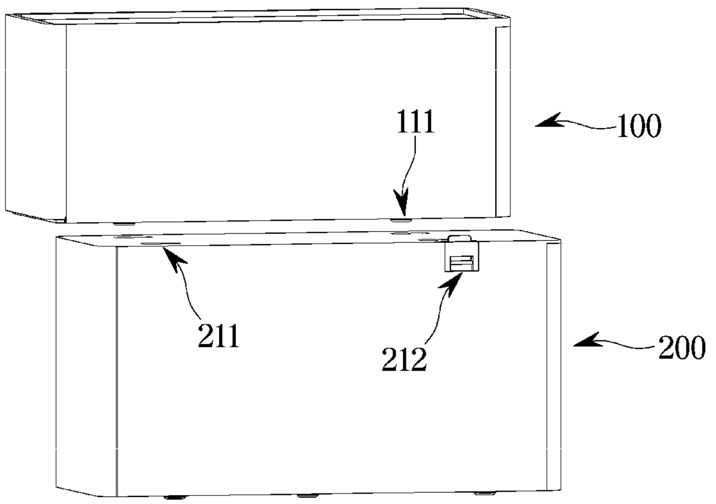
FIG. 17 shows a process of coupling the filter unit with the cold and hot water unit in the water purifier shown in FIG. 16.
Figure 17:
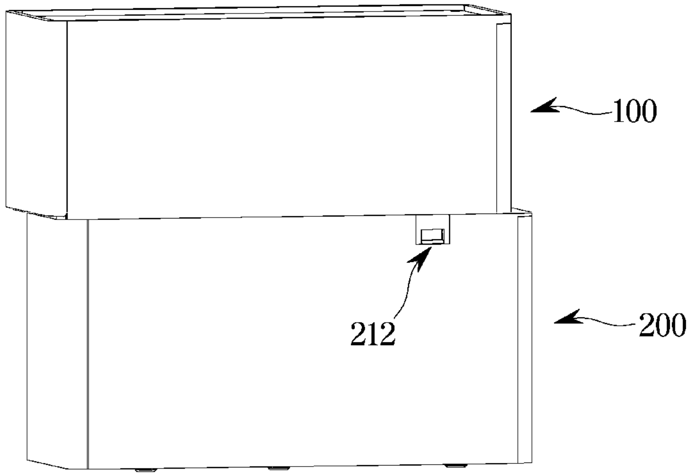
Figure 17:
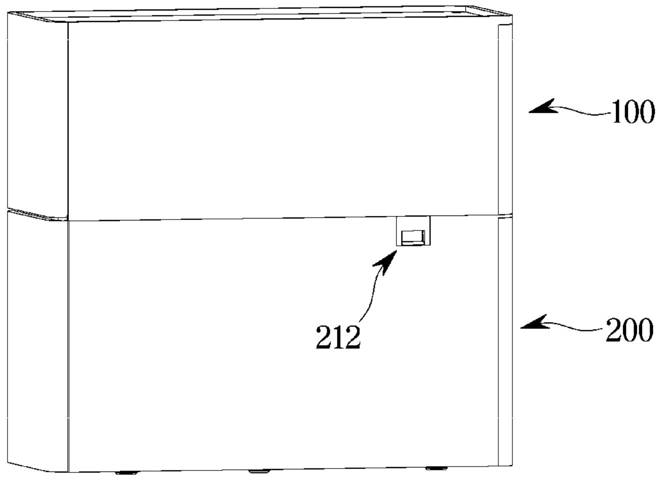

FIG. 16 shows a coupling relationship between the filter unit and the cold and hot water unit in the water purifier shown in FIG. 1. FIG. 17 shows a process of coupling the filter unit with the cold and hot water unit in the water purifier shown in FIG. 16.

A coupling relationship between the filter unit and the cold and hot water unit, as shown in FIG. 16, may be applied to a coupling relationship between the filter unit and the cold water unit in the water purifier according to another embodiment of the disclosure, as shown in FIG. 9, and may also be applied to a water purifier according to still another embodiment of the disclosure, as shown in FIG. 11.

Referring to FIGS. 16 and 17, the filter unit 100 may be coupled with the cold and hot water unit 200 in an up-down direction. That is, the first case 110 may be coupled with the second case 210 in the up-down direction.

A lower surface of the filter unit 100 is shown to be coupled with an upper surface of the cold and hot water unit 200, although not limited thereto. According to an arrangement of the individual modules, an upper surface of the filter unit 100 may be coupled with a lower surface of the cold and hot water unit 200, and the filter unit 100 may be coupled with the cold and hot water unit 200 at the side surfaces. Also, the control unit 400 and the cold and hot water unit 200, the control unit 400 and the cold water unit 200*a*, or the filter unit 100 and the cold water unit 200*a* may also be coupled with each other in the up-down direction or in a side direction.

The first case 110 may include a guide protrusion 111 protruding from the lower surface toward the upper surface of the second case 210. The second case 210 may include a guide groove 211 depressed from the upper surface. The guide protrusion 111 may be coupled with the guide groove 211.

The guide protrusion 111 may be spaced in front-rear and left-right directions on the lower surface of the first case 110. Because the guide groove 211 is formed in correspondence to the guide protrusion 111 to be coupled with the guide protrusion 111, the guide groove 211 may be spaced in the front-rear and left-right directions in the upper surface of the second case 210, although not limited thereto. However, the positions and arrangements of the guide protrusion 111 and the guide groove 211 are not limited to those shown in the drawing, and may change variously. Also, the guide protrusion 111 may be formed on the upper surface of the first case 110. In this case, the guide groove 211 may be formed in the lower surface of the second case 210 and coupled with the guide protrusion 111. In this case, the second case 210 may be located above the first case 110, and the first case 110 may be located below the second case 210.

The guide groove 211 may include a first portion 211*a* that is first coupled with the guide protrusion 111 upon coupling with the guide protrusion 111, and a second portion 211*b* that is coupled with the guide protrusion 111 after the guide protrusion 111 contacts the first portion 211*a* and then moves in the front-rear direction.

The guide protrusion 111 may be formed in a shape of a circle, although not limited thereto. However, the guide protrusion 111 may include various shapes.

The guide groove 211 may be formed in a shape corresponding to the guide protrusion 111 to be coupled with the guide protrusion 111. Particularly, the first portion 211*a* may be formed in a shape corresponding to the guide protrusion 111 to be in contact with the guide protrusion 111. The second portion 211*b* may be connected to an end of the first portion 211*a* and include a groove having a small width to limit, upon coupling of the guide protrusion 111 with the guide groove 211, a movement and departure in the up-down direction.

At least one guide protrusion 111 and at least one guide groove 211 may be provided. In FIG. 5, four guide protrusions 111 and four guide grooves 211 are shown, however, the numbers of the guide protrusions 111 and the guide grooves 211 are not limited to four.

The second case 210 may include a button assembly 212 formed on the upper surface. The first case 110 may include a button groove 112 in the lower surface to be coupled with the button assembly 212.

The button assembly 212 may be positioned at one side of the upper surface of the second case 210. A location and arrangement of the button assembly 212 are not limited to that shown in the drawing, and the button assembly 212 may be formed at various locations on the upper surface of the second case 210. Also, the button groove 112 may be formed in the upper surface of the first case 110. In this case, the button assembly 212 may be formed on the lower surface of the second case 210 and coupled with the button groove 112. In this case, the second case 210 may be located above the first case 110, and the first case 110 may be located below the second case 210.

The button assembly 212 may include a button 213, an elastic member 214, and a frame member 215. The button 213 may protrude from the upper surface of the second case 210 toward the lower surface of the first case 110 to prevent, upon coupling with the first case 110, a movement and departure in the left-right direction. One end of the button 213 may include a bent portion bent to be caught by the frame member 215. That is, the button 213 may include a "⌊" shape. The elastic member 214 may be positioned below the button 213. The elastic member 214 may be, upon coupling of the first case 110 with the second case 210, contracted by power applied downward from the button 213, and elastically restore, after the coupling is completed, the button 213 to its position before the coupling. The frame member 215 may surround the button 213 and the elastic member 214 on the upper surface of the second case 210. The frame member 215 may be formed in a "⌉" shape to prevent the button 213 and the elastic member 214 from departing to the outside. In the frame member 215, a hole having a shape corresponding to the bent portion of the button 213 may be formed to be coupled with the bent portion.

In the drawing, the filter unit 100 and the cold and hot water unit 200, that is, the first case 110 and the second case 210 are shown to be coupled with each other in the up-down direction, although not limited thereto. However, the first case 110 and the second case 210 may be coupled with each other in the left-right direction. In this case, the guide protrusion 111 may be formed on a left side surface of the first case 110, and the guide groove 211 may be formed in a right side surface of the second case 210. The button groove 112 may be formed in the left side surface of the first case 110, and the button assembly 212 may be formed in the right side surface of the second case 210.

Also, the guide protrusion 111 may be formed on a right side surface of the first case 110, and the guide groove 211 may be formed in a left side surface of the second case 210. In this case, the second portion 211*b* may be formed to limit, upon coupling of the first case 110 with the second case 210, a movement and departure in the left-right direction. The button groove 112 may be formed in the right side surface of the first case 110, and the button assembly 212 may be formed in the left side surface of the second case 210.

On the contrary, the guide groove 211 and the button groove 112 may be formed in the upper and lower surfaces and left and right surfaces of the first case 110. In this case, on a surface of the second case 210, which is coupled with the first case 110, the guide protrusion 111 and the button assembly 212 may be formed. That is, when the guide groove 211 is formed in the lower surface of the first case 110, the guide protrusion 111 may be formed in the upper surface of the second case 210.

The first case 110 may be slidingly coupled with the second case 210. In FIG. 17(*a*), the first case 110 may be in contact with the second case 210 in the up-down direction. At this time, the guide protrusion 111 may be in contact with the first portion 211*a* of the guide groove 211. Also, the button 213 may be pushed downward by the first case 110, and the elastic member 214 may be compressed. In FIG. 17(*b*), after the first case 110 is in contact with the second case 210, the first case 110 may slide in the right-left direction on the second case 210, and accordingly, a portion of the guide protrusion 111 may be coupled with the second portion 211*b*. In FIG. 17(*c*), after the coupling is completed, the button 213 may be inserted into the button groove 112, and the guide protrusion 111 may be completely coupled with the second portion 211*b* of the guide groove 211.

Figure 18:
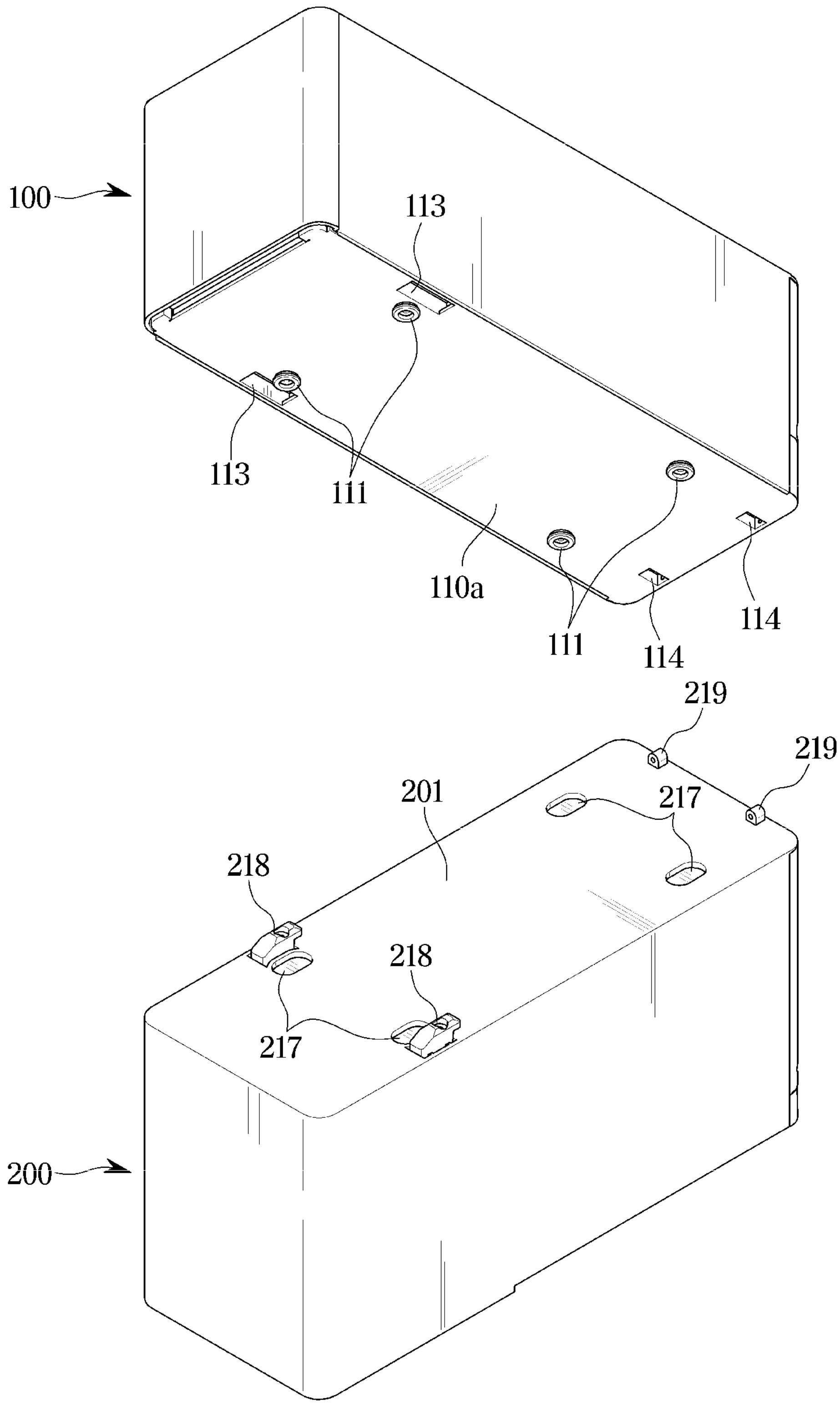
FIG. 18 shows a coupling relationship between a filter unit and a cold and hot water unit in a water purifier according to another embodiment of the disclosure.

FIG. 18 shows a coupling relationship between a filter unit and a cold and hot water unit in a water purifier according to another embodiment of the disclosure.

Referring to FIG. 18, the filter unit 100 may include a first accommodating groove 113 and a second accommodating groove 114. The cold and hot water unit 200 may include a first coupling member 218 and a second coupling member 219.

The first accommodating groove 113 and the second accommodating groove 114 may be depressed from the lower surface of the first case 110 to be respectively coupled with the first coupling member 218 and the second coupling member 219. Accordingly, the first accommodating groove 113 may have a shape corresponding to the first coupling member 218. The second accommodating groove 114 may also have a shape corresponding to the second coupling member 219.

The first accommodating groove 113 may be adjacent to the left and right side surfaces of the first case 110, although not limited thereto. The first accommodating groove 113 may be formed at various locations as long as the first accommodating groove 113 is formed in the lower surface of the first case 110. Also, the second accommodating groove 114 may be adjacent to front and rear surfaces of the first case 110, although not limited thereto.

The first coupling member 218 may be coupled with the first accommodating groove 113. The first coupling member 218 may include a protrusion at one end. The first accommodating groove 113 may include a coupling groove, which is not shown, to be coupled with the protrusion therein. The protrusion may be coupled with the coupling groove to limit a movement in up-down direction of the first case 110 and the second case 210. In this case, likewise, the first case 110 may be slidingly coupled with the second case 210.

The second coupling member 219 may be coupled with the second accommodating groove 114 to limit a movement in the left-right direction upon coupling of the first case 110 with the second case 210.

The water purifier 1 may include a second guide groove 217 depressed from the upper surface of the second case 210. The above-described guide groove 211 may be a first guide groove 211. The second guide groove 217 may be coupled with the guide protrusion 111.

So far, specific embodiments have been shown and described. However, the disclosure is not limited to the above-described embodiments, and various modifications can be made by those skilled in the art without departing from the gist of the technical idea of the disclosure defined by the claims below.

What is claimed is:

1. A water purifier comprising:
a first module including:
a filter unit including a plurality of filters configured to purify water,
a first input and output port, and
a cold water unit or a cold and hot water unit that is couplable to the filter unit and includes:
a first connector including a connection port, and
an evaporator that is configured to cool the purified water while the cold water unit or the cold and hot water unit is coupled to the filter unit;
a second module couplable to the first module, the second module including:
a second connector including a direct current port and an alternating current port,
a controller, and
a second input and output port that is electrically connectable to the first input and output port;
a direct current wire connectable between the connection port and the direct current port;
an alternating current wire connectable between the connection port and the alternating current port; and
a water supply module including:
a display connectable to the second module, the display configured to display operation information of the water purifier while the display is connected to the second module, and
a water supply nozzle to receive the purified water from the first module and discharge the purified water to an outside of the water purifier,
wherein the controller is configured to:
while the second module is coupled with the first module, the direct current wire is connected between the connection port and the direct current port, and the alternating current wire is connected between the connection port and the alternating current port, control the first module, and
while the second module is coupled to the first module, the direct current wire is connected between the connection port and the direct current port, the alternating current wire is connected between the connection port and the alternating current port, and the display is connected to the second module, control the display to display a purified water supply mode, and,
while the second module is coupled to the first module, the display is connected to the second module, the direct current wire is connected between the connection port and the direct current port, the alternating current wire is connected between the connection port and the alternating current port, and the cold water unit or the cold and hot water unit is coupled to the filter unit,
recognize when the second input and output port becomes electrically connected to the first input and output port so as to,
upon the cold water unit being coupled to the filter unit,
identify the cold water unit being coupled to the filter unit and, based on identifying the cold water unit is coupled to the filter unit, control the display to display a cold water supply mode, or
upon the cold and hot water unit being coupled to the filter unit,
identify the cold and hot water unit being coupled to the filter unit and, based on identifying the cold and hot water unit is coupled to the filter unit, control the display to display a cold and hot water supply mode.

2. The water purifier of claim 1, wherein
the first module further includes a filter case that forms an outer appearance of the filter unit and accommodates the plurality of filters, and
the second module further includes a control case that forms an outer appearance of the second module, the control case configured to accommodate the controller and to be couplable to the filter case.

3. The water purifier of claim 2, wherein
the first input and output port is at one side of the filter case, and
the second input and output port is at one side of the control case.

4. The water purifier of claim 3, wherein
the first module includes the cold water unit, and
the controller is further configured to:
while the second module is coupled to the first module, the display is connected to the second module, and the cold water unit is coupled to the filter unit, recognize the second input and output port being electrically connected to the first input and output port and change a supply mode to a cold water supply mode, and
control the display to display the cold water supply mode.

5. The water purifier of claim 3, wherein
the first module includes the cold and hot water unit that further includes a heater configured to heat the purified water, and
the controller is further configured to:
while the second module is coupled to the first module, the display is connected to the second module, and the cold and hot water unit is coupled to the filter unit, recognize the second input and output port being electrically connected to the first input and output port and change a supply mode to a cold and hot water supply mode, and
control the display to display the cold and hot water supply mode.

6. The water purifier of claim 2, wherein
the second module further includes:
an internal pipe along which the purified water is movable inside the control case, and
an inlet and outlet portion in an outer surface of the control case, and the purified water is flowable to enter or exit the control case through the inlet and outlet portion.

7. The water purifier of claim 4, wherein the first module further includes a cold water case that forms an outer appearance of the cold water unit and accommodates the evaporator, and the cold water case is slidingly couplable with the filter case.

8. The water purifier of claim 5, wherein the first module further includes a cold and hot water case that forms an outer appearance of the cold and hot water unit and accommodates the evaporator and the heater, and the cold and hot water case is slidingly couplable with the filter case.

9. The water purifier of claim 1, further comprising:

at least one connecting hose provided between the first module and the second module to connect the first module to the second module, wherein the at least one connecting hose includes:

a raw water connecting hose along which raw water moves, a purified water connecting hose along which the purified water moves, and a drainage water connecting hose through which drainage water is discharged to the outside.

10. The water purifier of claim 4, wherein the first module further includes:

the filter case, and a cold water case that is couplable to at least one of the filter case or the control case, and that accommodates the evaporator, the second module further includes:

the control case, and a first connecting portion that is depressed from a coupling surface of the control case, the cold water case includes a second connecting portion that is connectable to the first connecting portion and that protrudes from a coupling surface of the cold water case and that is configured to correspond to the first connecting portion when the cold water case is coupled to the control case, and when the cold water case is coupled to the control case and the first connecting portion is coupled to the second connecting portion, cooled purified water is flowable from the cold water case to the control case through the coupled first connecting portion and the second connecting portion.

11. The water purifier of claim 5, wherein the first module further includes:

the filter case, and a cold and hot water case that is couplable to at least one of the filter case or the control case, and that accommodates the evaporator and the heater, and the second module further includes:

the control case, and a first connecting portion that is depressed from a coupling surface of the control case, the cold and hot water case includes a second connecting portion that is connectable to the first connecting portion and that protrudes from a coupling surface of the cold and hot water case and that is configured to correspond to the first connecting portion when the cold and hot water case is coupled to the control case, and when the cold and hot water case is coupled to the control case and the first connecting portion is coupled to the second connecting portion, cooled or heated purified water is flowable from the cold and hot water case to the control case through the coupled first connecting portion and the second connecting portion.

12. The water purifier of claim 10, wherein the second module further includes a control unit including the controller and the control case, the first connecting portion includes:

a purified water outlet, a cold water inlet, and a first connector, and the second connecting portion includes:

a purified water inlet connectable to the purified water outlet, a cold water outlet connectable to the cold water inlet, and a second connector electrically connectable to the first connector, and the first connecting portion and the second connecting portion are configured so that, when the cold water case is coupled to the control case, the purified water outlet is connected to the purified water inlet so that the purified water is dischargeable from the control unit to the cold water unit, the cold water inlet is connected to the cold water outlet so that the purified water cooled by the evaporator is flowable from the cold water unit to the control unit, and the first connector is electrically connected to the second connector.

13. The water purifier of claim 11, wherein the second module further includes a control unit including the controller and the control case, the first connecting portion includes:

a purified water outlet, a cold water inlet, a hot water inlet, and a first connector, and the second connecting portion further includes:

a purified water inlet connectable to the purified water outlet, a cold water outlet connectable to the cold water inlet, a hot water outlet connectable to the hot water inlet, and a second connector electrically connectable to the first connector, and the first connecting portion and the second connecting portion are configured so that, when the cold and hot water case is coupled to the control case, the purified water outlet is connected to the purified water inlet so that the purified water is dischargeable from the control unit to the cold and hot water unit, the cold water inlet is connected to the cold water outlet so that the purified water cooled by the evaporator is flowable from the cold and hot water unit to the control unit, the hot water inlet is connected to the hot water outlet so that the purified water heated by the heater is flowable from the cold and hot water unit to the control unit, and the first connector is electrically connected to the second connector.

14. The water purifier of claim 2, wherein the filter case includes a coupling groove, the control case includes a coupling protrusion having a shape corresponding to the coupling groove and configured so that, with the coupling protrusion inserted into the coupling groove, the filter case is coupled to the control case.

15. The water purifier of claim 14, wherein the control case further includes a push button configured to move the coupling protrusion to couple or separate the coupling protrusion from the coupling groove.

16. The water purifier of claim 14, wherein the coupling protrusion includes an inclined surface.

17. The water purifier of claim 2, further comprising:

a case configured to accommodate the cold water unit or the cold and hot water unit and including a plurality of guide grooves recessed from a surface of the case, wherein the filter case further includes a plurality of guide protrusions respectively corresponding to the plurality of guide grooves and protruded from a surface of the filter case, and the plurality of guide grooves are shaped to and correspond to the plurality of guide grooves so that, with the plurality of guide protrusions respectively received in the plurality of guide grooves the case and the filter case are coupled.

18. The water purifier of claim 17, wherein the case further includes a button, the filter case includes a button groove, and the button and the button groove are configured so that, with the case and the filter case are coupled, the button is inserted into the button groove to prevent movement between the case and the filter case.

* * * * *